(12) United States Patent
Baker

(10) Patent No.: US 11,949,757 B2
(45) Date of Patent: *Apr. 2, 2024

(54) METHOD, APPARATUS AND SYSTEM FOR SUBSCRIPTION MANAGEMENT

(71) Applicant: BGC PARTNERS, L.P., New York, NY (US)

(72) Inventor: Andre Baker, West Orange, NJ (US)

(73) Assignee: BGC PARTNERS, L.P., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/073,634

(22) Filed: Dec. 2, 2022

(65) Prior Publication Data

US 2023/0156098 A1 May 18, 2023

Related U.S. Application Data

(63) Continuation of application No. 17/495,203, filed on Oct. 6, 2021, now Pat. No. 11,522,976.

(51) Int. Cl.
*H04L 67/60* (2022.01)
*H04L 67/00* (2022.01)
*H04L 67/55* (2022.01)

(52) U.S. Cl.
CPC .............. *H04L 67/60* (2022.05); *H04L 67/34* (2013.01); *H04L 67/55* (2022.05)

(58) Field of Classification Search
CPC .......... H04L 67/60; H04L 67/55; H04L 67/34
USPC ......................................................... 709/219
See application file for complete search history.

(56) References Cited

U.S. PATENT DOCUMENTS

| | | | | |
|---|---|---|---|---|
| 7,107,543 | B2 * | 9/2006 | Berry | H04L 67/75 715/744 |
| 2005/0216916 | A1 * | 9/2005 | Stall | G06F 9/451 719/314 |
| 2005/0273499 | A1 * | 12/2005 | Goodman | H04L 67/02 709/206 |
| 2015/0012616 | A1 * | 1/2015 | Pearl | H04L 67/1095 709/219 |

* cited by examiner

*Primary Examiner* — Zi Ye

(57) ABSTRACT

Subscription management system and method provides real time subscription data dissemination to multiple computer devices of respective clients based on client subscriptions, using a UI message framework that decreases size and frequency of transmission of UI messages to service the subscriptions.

20 Claims, 11 Drawing Sheets

| ID | InstrumentID | Side | Qty | Price | Customer | Instrument Ticker | Instrument Name | CustomerName | Customer LongName |
|---|---|---|---|---|---|---|---|---|---|
| 1001 | 12 | B | 100 | 101 | 1 | MSFT | Microsoft Corporation | CUSTOMER1 | Bill Gates |
| 1002 | 13 | B | 102 | 102 | 4 | GOOG | Alphabet Inc | CUSTOMER4 | Sergey Brin |
| 1003 | 12 | B | 104 | 103 | 4 | MSFT | Microsoft Corporation | CUSTOMER4 | Sergey Brin |
| 1004 | 12 | B | 106 | 104 | 1 | MSFT | Microsoft Corporation | CUSTOMER1 | Bill Gates |
| 1005 | 12 | B | 108 | 105 | 4 | MSFT | Microsoft Corporation | CUSTOMER4 | Sergey Brin |
| 1006 | 13 | B | 110 | 106 | 1 | GOOG | Alphabet Inc | CUSTOMER1 | Bill Gates |
| 1007 | 13 | B | 112 | 107 | 4 | GOOG | Alphabet Inc | CUSTOMER4 | Sergey Brin |
| 1008 | 13 | S | 114 | 108 | 1 | GOOG | Alphabet Inc | CUSTOMER1 | Bill Gates |
| 1009 | 13 | S | 116 | 109 | 4 | GOOG | Alphabet Inc | CUSTOMER4 | Sergey Brin |
| 1010 | 12 | S | 118 | 110 | 1 | MSFT | Microsoft Corporation | CUSTOMER1 | Bill Gates |
| 1011 | 12 | B | 120 | 111 | 4 | MSFT | Microsoft Corporation | CUSTOMER4 | Sergey Brin |
| 1012 | 12 | S | 122 | 112 | 1 | MSFT | Microsoft Corporation | CUSTOMER1 | Bill Gates |
| 1013 | 13 | S | 124 | 113 | 4 | GOOG | Alphabet Inc | CUSTOMER4 | Sergey Brin |
| 1014 | 12 | S | 1789 | 113 | 1 | MSFT | Microsoft Corporation | CUSTOMER1 | Bill Gates |

FIG. 6

| ID | InstrumentID | Bid | Offer | Last Trade | Exchange | Instrument Ticker | Instrument Name |
|---|---|---|---|---|---|---|---|
| | 12 | 143.56 | 144.56 | 144.56 | NASD | MSFT | Microsoft Corporation |
| | 13 | 780.67 | 781.67 | 780.67 | NYSE | GOOG | Alphabet Inc |
| | 14 | 143.57 | 144.57 | 143.57 | EDGX | AAPL | Apple Incorporation |

FIG. 7

| ID | Instrument Name | Side | Qty | Price | Exchange |
|---|---|---|---|---|---|
| 1001 | Microsoft Corporation | B | 100 | 101 | NASD |
| 1004 | Microsoft Corporation | B | 106 | 104 | NASD |
| 1010 | Microsoft Corporation | S | 118 | 110 | NASD |
| 1012 | Microsoft Corporation | S | 122 | 112 | NASD |
| 1014 | Microsoft Corporation | S | 1789 | 114 | NASD |

FIG. 8

METHOD, APPARATUS AND SYSTEM FOR SUBSCRIPTION MANAGEMENT

CROSS-REFERENCE TO RELATED APPLICATIONS

This application is a continuation of U.S. patent application Ser. No. 17/495,203 filed Oct. 6, 2021, which is incorporated by reference herein in its entirety.

TECHNOLOGICAL FIELD

The present disclosure generally relates to managing subscriptions to provide object updates to clients.

BACKGROUND

Subscription management systems provide client devices with updates of data of various subjects subscribed to by users of the respective client devices. For example, in the financial industry, traders that electronically trade financial instruments using an electronic trading system often subscribe to services that provide trading related data including, for example, trading portfolio information and real time market information related to financial instruments in a trading portfolio from external data sources. The staggering amount of trading information available for electronic delivery to clients from subscription management systems that provide financial instrument trading information, and the need to ensure that clients electronically receive current trading information in real time according to client specific requirements for select financial instrument trading information available from the subscription management systems, result in use of substantial bandwidth of a communication network, and a significant amount of computer processing and data storage resources, at the computer(s) of a subscription management system that provides the subscription data to computers of respective clients and the computers of the respective clients. The technical problems of large processing burdens on computers of servers of subscription management systems and computers of clients receiving the subscription data are particularly acute for subscriptions having real time data contexts, in which updated subscription data needs to be disseminated to computers of clients in real time as updates occur.

Accordingly, there exists a need for method, apparatus and system that uses an improved computer and networking architecture to minimize processing resource usage, bandwidth usage, memory consumption and processing latencies, and to increase reliability, efficiency and speed of processing in disseminating subscription data with real time updates to computers of clients in accordance with subscriptions of respective clients.

SUMMARY

In accordance with an aspect of the present disclosure, a subscription management system may include at least one memory configured to store: client subscription data for a client subscription of at least one client, and subscription subject data indicating a data set including a plurality of subjects available for selection for a given client subscription, in which each of the subjects has a respective change rate; and at least one processor configured to control: receiving, over a communication network, from at least one client device of the at least one client, a subscribe request for a client subscription identifying subscribed to subjects of the data set selected for respective subscription items; generating a server subscription array based on the subscribe request, in which each subscription item of the client subscription corresponds to a row of the server subscription array identified by a row identifier and includes at least one subscribed to subject; generating, for each subscribed to subject of a respective subscription item of the client subscription indicated in the server subscription array, a subject message thread indicating a current value of the subscribed to subject; generating thread safe messages respectively from the subject message threads; retrieving, by random access to the thread safe messages based on the row identifiers indicated in the server subscription array and associated respectively with the thread safe messages, object values respectively indicated for the subscribed to subjects of the thread safe messages associated with the row identifiers; generating a user interface (UI) message indicating a byte array representative of at least one current object value respectively of at least one of the subscribed to subjects for a given subscription item having a given row identifier in the server subscription array retrieved by accessing the thread safe messages, for display at the client device in a client view array in accordance with the client subscription, in which a given current object value for a given subscribed to subject of the subscribed to subjects is included in the byte array based on a given change rate respectively corresponding to the given subscribed to subject; and transmitting, over the communication network to the client device, the UI message.

In accordance with an aspect of the present disclosure, a method may include controlling, by at least one processor receiving, over a communication network, from at least one client device of at least one client, a subscribe request for a client subscription identifying subscribed to subjects of a data set including a plurality of subjects available for selection for a given client subscription selected for respective subscription items, in which each of the subjects of the data set has a respective change rate; generating a server subscription array based on the subscribe request, in which each subscription item of the client subscription corresponds to a row of the server subscription array identified by a row identifier and includes at least one subscribed to subject; generating, for each subscribed to subject of a respective subscription item of the client subscription indicated in the server subscription array, a subject message thread indicating a current value of the subscribed to subject; generating thread safe messages respectively from the subject message threads; retrieving, by random access to the thread safe messages based on the row identifiers indicated in the server subscription array and associated respectively with the thread safe messages, object values respectively indicated for the subscribed to subjects of the thread safe messages associated with the row identifiers; generating a user interface (UI) message indicating a byte array representative of at least one current object value respectively of at least one of the subscribed to subjects for a given subscription item having a given row identifier in the server subscription array retrieved by accessing the thread safe messages, for display at the client device in a client view array in accordance with the client subscription, in which a given current object value for a given subscribed to subject of the subscribed to subjects is included in the byte array based on a given change rate respectively corresponding to the given subscribed to subject; and transmitting, over the communication network to the client device, the UI message.

In accordance with an aspect of the present disclosure, a non-transitory storage medium may be configured to store instructions which, when executed by at least one processor, control: receiving, over a communication network, from at least one client device of at least one client, a subscribe request for a client subscription identifying subscribed to subjects of a data set including a plurality, of subjects available for selection for a given client subscription selected for respective subscription items, in which each of the subjects of the data set has a respective change rate; generating a server subscription array based on the subscribe request, in which each subscription item of the client subscription corresponds to a row of the server subscription array identified by a row identifier and includes at least one subscribed to subject; generating, for each subscribed to subject of a respective subscription item of the client subscription indicated in the server subscription array, a subject message thread indicating a current value of the subscribed to subject; generating thread safe messages respectively from the subject message threads; retrieving, by random access to the thread safe messages based on the row identifiers indicated in the server subscription array and associated respectively with the thread safe messages, object values respectively indicated for the subscribed to subjects of the thread safe messages associated with the row identifiers; generating a user interface (UI) message indicating a byte array representative of at least one current object value respectively of at least one of the subscribed to subjects for a given subscription item having a given row identifier in the server subscription array retrieved by accessing the thread safe messages, for display at the client device in a client view array in accordance with the client subscription, in which a given current object value for a given subscribed to subject of the subscribed to subjects is included in the byte array based on a given change rate respectively corresponding to the given subscribed to subject; and transmitting, over the communication network to the client device, the UI message.

BRIEF DESCRIPTION OF THE DRAWINGS

FIG. 6 illustrates an exemplary configuration of a server subscription array, according to the present invention.

FIG. 7 illustrates an exemplary configuration of another server subscription array, according to the present invention.

FIG. 8 illustrates an exemplary configuration of a client view array, according to the present disclosure.

DETAILED DESCRIPTION

Figure 1:
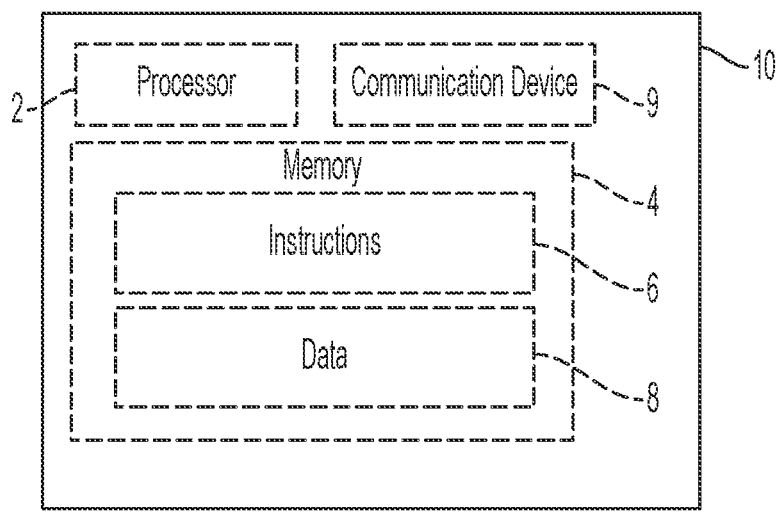
FIG. 1 is a block diagram of an exemplary subscription management apparatus, according to the present disclosure.

The technology of the present disclosure relates to, by way of example, a computer and networking architecture that may control dissemination of subscription data in real time to computer devices of respective clients that subscribe to a subscription service, where the clients may dynamically select subscription subjects ("subjects") for which data is provided under a client subscription, utilizing a user interface (UI) message framework that decreases the size and frequency of transmission in real time to a computer device of a client of UI messages including client subscription data in accordance with a client subscription. In one embodiment, the UI messages may have a Java Script Object Notation (JSON) message format and include a byte array containing client subscription data as object values from which a client view array is generated and displayed at a display of a computer device of a client. Advantageously, the technical problems of burdensome usage of processing resources and memory at a subscription data server and computer devices of respective clients, and communication network bandwidth, to satisfy requirements of real time subscription data dissemination to multiple computer devices of respective clients based on client subscriptions, are solved by the technical solution of a subscription management technology using a UI message framework according to the present disclosure that decreases size and frequency of transmission of UI messages and also minimizes string processing on a computer device of a client by using numeric values in UI messages to represent string constants corresponding to subjects of a client subscription. In an exemplary embodiment as illustrated herein, a subscription management system according to the present disclosure may be implemented in connection with an electronic financial instrument trading system to address the needs of a financial instrument trader as a client, to have trading data for subjects subscribed to by the trader that relate respectively to, for example, orders and market data for particular financial instruments, displayed on a trade blotter at a computer of the trader with updated data for the subjects in real time. It is to be understood that the features in accordance with the present disclosure may be applied to other subscription management services that require real time data dissemination while minimizing the amount of data processed and stored and typically include a data set having a very large number of subjects available for subscription for which clients desire to subscribe to a smaller subset of the available subjects, such as, for example, news, person to person text messaging and other like dynamic client subscription systems.

The present disclosure may be implemented using a combination of computer hardware and computer software to form a specialized machine capable of performing operations. Embodiments of the present disclosure may be performed utilizing a combination of central processing units (CPUs), physical memory, physical storage, electronic communication ports, electronic communication lines and other computer hardware. The computer software may include at least a computer operating system and specialized computer processes described herein.

In the present disclosure, certain specific details are set forth to provide a thorough understanding of various disclosed embodiments. However, one skilled in the relevant art will recognize that embodiments may be practiced without one or more of these specific details, or with other methods, components, etc. In other instances, well-known structures associated with an electronic trading system have not been shown or described in detail to avoid unnecessarily obscuring descriptions of the embodiments.

The aspects, features and advantages of the present disclosure will be appreciated when considered with reference to the following description of examples and accompanying figures. In describing the exemplary embodiments of the disclosure illustrated in the drawings, specific terminology will be used for the sake of clarity. However, the disclosure is not intended to be limited to the specific terms used.

Example Systems

FIG. 1 illustrates a block diagram of an exemplary electronic subscription management computing apparatus 10, in accordance with the present disclosure. The apparatus 10 may be communicatively coupled over a communication network to a plurality of remote client devices and a plurality of external data sources. In some embodiments, advantageously according to the present disclosure, the apparatus 10 may provide a subscription management services platform and perform subscription management processing functions that decrease the size and number of messages generated, transmitted, received and processed by components of the apparatus 10, and also computing devices to which subscription data is provided by the apparatus 10, in connection with, in real time, processing, managing, transmitting and displaying at a user interface of computing devices of respective clients, subscription data associated with subscription contracts of clients to receive selected subjects of subscription data, for example, data associated with electronic financial instrument trading, with real time updates, which provides the technical advantages of minimizing usage of network bandwidth, processing resources and memory resources, as described in detail below.

Referring to FIG. 1, the computing apparatus 10 may be in the form of a computing device that includes one or more processors 2, one or more memory 4, and other components commonly found in computing devices. In one embodiment, the one or more processors 2 may include or be configured to operate as one or more servers.

The memory 4 may store information accessible by the one or more processors 2, including instructions 6 that may be executed by the one or more processors 2. Memory 4 may also include data 8 that can be stored, manipulated, or retrieved by the processor. The data 8 may also be used for executing the instructions 6 and/or for performing other functions. The memory 4 may be any type of non-transitory media readable by the one or more processors, such as a hard-drive, solid state hard-drive, memory card, ROM, RAM, DVD, CD-ROM, write-capable, read-only memories, etc.

The instructions 6 may be any set of instructions capable of being read and executed by the one or more processors 2. The instructions may be stored in a location separate from the computing device, such as in a network attached storage drive, or locally at the computing device. The terms "instructions," "functions," "application," "steps," and "programs" may be used interchangeably herein.

Data 8 may be stored, retrieved and/or modified by the one or more processors 2 in accordance with the instructions 6. Such data may be stored in one or more formats or structures, such as in a relational or non-relational database, in a SQL database, as a table having many different fields and records, XLS, TXT, or XML documents. The data may also be formatted in any computing device-readable format. In some embodiments the data may be encrypted.

In addition, the apparatus 10 may include a communication device 9 configured to provide wired or wireless communication capabilities.

The one or more processors 2 may be any type of processor, or more than one type of processor. For example, the one or more processors 2 may be CPUs from Intel, A M D, and Apple, or application specific integrated circuits (ASIC) or system on chips (SoCs).

Apparatus 10 may include all the components normally used in connection with a computer. For example, apparatus 10 may have a keyboard and mouse and/or various other types of input devices such as pen-inputs, joysticks, buttons, touch screens, etc., as well as a display, which could include, for instance, a CRT, LCD, plasma screen monitor, TV, projector, etc.

FIG. 1 illustrates the components of the apparatus 10 as being single components, however, the components may actually comprise multiple processors, computers, computing devices, or memories that may or may not be stored within the same physical housing. For example, the memory may be a hard drive or other storage media located in housings different from that of the apparatus 10. Accordingly, references to a processor, computer, computing device, or memory herein will be understood to include references to a collection of processors, computers, computing devices, or memories that may or may not operate in parallel. Further, although some functions described below are indicated as taking place on a single computing device having a single processor, various aspects of the subject matter described herein may be implemented by a plurality of computing devices in series or in parallel. For example, in one embodiment, functions performed by the apparatus 10 as described below may at least be partially performed at another computing apparatus having the same or similar components as the apparatus 10. In one embodiment, functions described herein as performed by the apparatus 10 may be distributed among one or more computing devices (servers) that operate as a cloud system.

Figure 2:
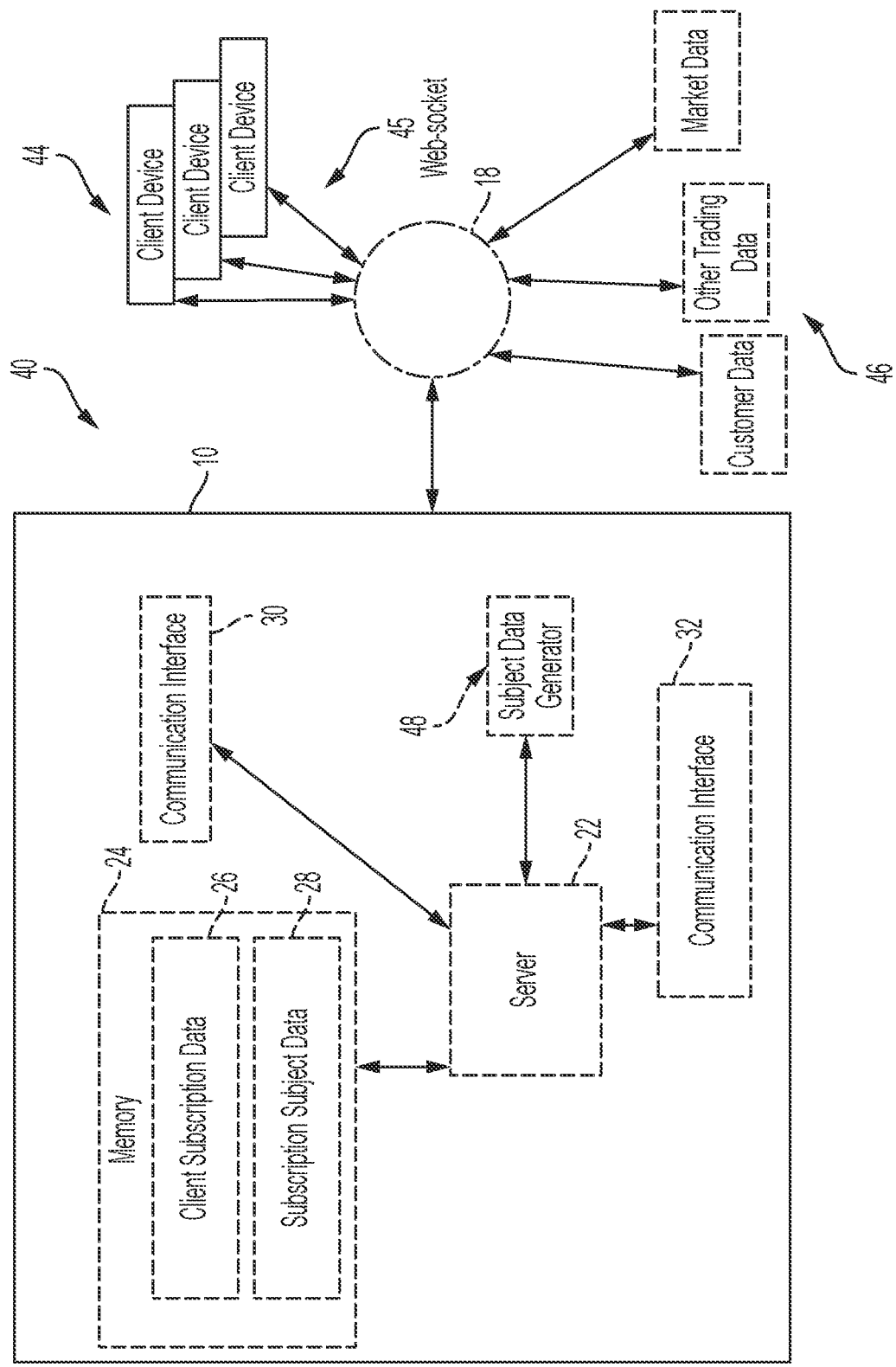
FIG. 2 is a block diagram of an exemplary subscription management system, according to the present disclosure.

Referring to FIG. 2, apparatus 10 may be interconnected with other computers via a communication network 18, which may be a local area network ("LAN"), wide area network ("WAN"), the Internet, etc. Network 18 and intervening nodes may also use various protocols including virtual private networks, local Ethernet networks, private networks using communication protocols proprietary to one or more companies, cellular and wireless networks, HTTP, and various combinations of the foregoing. In addition, the network 18 may utilize a variety of networking protocols now available or later developed including, but not limited to TCP/IP based networking protocols.

Although only a single computing apparatus 10 (computer) is depicted herein it should be appreciated that a computing apparatus in accordance with the present disclosure may include additional interconnected computers. It should further be appreciated that apparatus 10 may be an individual node in a network containing a larger number of computers.

The instructions residing in a non-transitory memory may comprise any set of instructions to be executed directly (such as machine code) or indirectly (such as scripts) by processor 2. In this regard, the terms "instructions," "scripts," or "modules" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

Referring to FIG. 2, in some embodiments, the apparatus 10 may be configured to implement specific functions and operations in a subscription management system 40 in accordance with the present disclosure, and in some embodiments may be programmed with programs to perform some or all of the functions and operations described herein.

Referring to FIG. 2, the apparatus 10 may include a server 22, a memory 24 configured to store client subscription data 26 and subscription subject data 28, a communication interface 30, a communication interface 32 and a subject data generator 48. Each of the server 22, communication interfaces 30 and 32 and subject data generator 48 may include a processor and memory including instructions that implement functions of the respective component, as described below. The apparatus 10 may be part of the subscription management system 40 and configured to be communicatively coupled over the communication network 18 through the interface 30 with a plurality of computers as client devices 44, and through the interface 32 with a plurality of external data sources 46. For ease of reference and convenience, the disclosure herein that the server 22 or another component of the system 40 may perform a function or operation, is a disclosure that a processor or circuitry of the server 22 or the another component of the system 40 may perform or control the performance of the function or operation.

In one embodiment, the apparatus 10 may be configured to communicate over the communication network 18 using a networking protocol configured to enable communication through the interfaces 30 over the communication network 18 via web-sockets 45 with the client devices 44, and perform functions associated with and to implement a subscription service that services subscriptions of clients ("client subscriptions") at a plurality of client devices. In one embodiment, the apparatus 10 may use a custom protocol of Java Script Object Notation (JSON) as a networking protocol to send UI messages including subscription data via a web-socket 45 to a client device 44 to service a client subscription. In one embodiment, the UI messages may include client subscription data as object values of arrays and be formatted via a plurality of JSON protocols, such as JSON over RPC, JSON over REST/HTTP, and the like.

In one embodiment, one or more of the client devices 44 may be a laptop, desktop or mobile computing device, such as a smartphone or tablet. The one or more client devices may execute an "app" to interact with the server 22 and interface 30. The app, for example, may execute on a mobile device operating system, such as Apple Inc.'s iOS®, Google Inc.'s Android®, or Microsoft Inc.'s Windows 10 Mobile®, which provides a platform that allows the app to communicate with particular hardware and software components of the mobile device. For example, the mobile device operating system may provide functionalities for interacting with location services circuitry, wired and wireless network interfaces, user contacts, and other applications, where the functionalities include application programming interfaces (APIs) that enable communication with hardware and software modules executing outside of the app, such as included in the apparatus 10. In one embodiment, the client device 44 may, via the app executing on the client device 44, be configured to communicate with the apparatus 10 via one or more web-sockets 45.

In one embodiment, one or more of the data sources 46 may be a computing device, including a mobile computing device, having processing and communication capabilities, and execute software instructions or an "app" to interact with the server 22 and interface 32, and in particular transmit data for respective subjects of a data set available for client subscriptions. In one embodiment, the data sources 46 may be external to the apparatus 10 and provide data including real time data for use in servicing a subscription to subjects of a data set by a user ("client") of a computer device having a subscription with the apparatus 10. In one embodiment, the data source 46 may be, for example, an internal or external financial venue or exchange, a financial trading clearinghouse, a middle/back office that provides post trade and allocation data, a market data source that provides real time financial market data by multicast or point to point communication, and a database of trading information including data describing attributes of a subscription account of a client.

In one embodiment, the interface 30 may be configured to establish a communication link with a client device 44 using a Point to Point Financial Information eXchange (FIX) protocol.

In one embodiment, the interface 32 may be configured as a gateway through which a communication link is established with a data source 46.

The subject data generator 48 may generate data for a particular subject of a data set available for a client subscription, based on data from the data sources 46 or other data related to a subject of the data set and stored in the memory 24.

The server 22 may be configured to control receiving messages defining parameters of a client subscription transmitted from one or more client devices 44, receiving incoming messages from the data sources 46 containing external data of or related to subscription subjects available for subscription from a data set, and obtaining or receiving internal data from the data generator 48 that constitutes or may be used to determine data of respective subjects of a data set for which a client subscription is available. The external data and internal data may be a numeric value, text character(s) or a combination of a numeric value and text character(s). The data set for a subscription may include (i) subjects for which data is mostly unchanging or changes infrequently over a predetermined period of time, for example, data which changes about 0-2 times a day ("static data"); and (ii) subjects for which data changes frequently, for example, multiple times per second, and in some embodiments at a pre-set rate based on operations performed by the subject data generator 48 ("transactional data"). As discussed in detail below, although the data of the subjects may change in real time based on external data that changes in real time, the subjects may be designated with respective change rates, based on whether the subject concerns static data or transactional data. The change rates may determine when the server 22 generates, and transmits to a client device, a UI message with a current value of the data of the subject to service a client subscription. The utilization of change rates to control transmission of UI messages including updated data for respective subjects to service the client subscription advantageously reduces processing, network bandwidth and data storage resource usage in providing subscription services according to the present disclosure, because updated data for respective subjects for a client subscription may be transmitted at a pre-configured rate as the change rate specific to the type of data of the subject, as opposed to a rate at which the data for the subject is changing. For example, a data set for an electronic financial instrument data subscription according to the present disclosure may include subjects having (i) static data, such as the name of a trading book of a trader (e.g., "BookName") that includes a particular financial instrument for which subscription data is subscribed to by a trader under a client subscription; and (ii) transactional data, such as a number of shares of the particular financial instrument traded thus far during a day (e.g., "OrderRecords"), a real time market price of the particular financial instrument (e.g., "MarketDataRecords"), and a result of a calculation performed at a predetermined timing (e.g., "CalcRecords"), such as every 500 milliseconds by the server 22, using data from the subject data generator 48 or of other subjects in the data set. In one embodiment, the data for a subject including transactional data may change in real time more frequently than a change rate designated for the subject, such as, for example, when the subject is a current market price of a financial instrument that is based on real time external market data.

In addition, the server 22 may be configured to control generating UI messages including current data for respective subjects of a client subscription. In one embodiment, the UI messages may contain or indicate the current data for subjects of a client subscription as object values in a JSON message. The server 22 may transmit UI messages via an interface 30 over the communication network 18 and websockets 45 to one or more client devices 44, to cause display of a client view array in a trade blotter at the client device, where the client view array includes the current data for the subjects of the client subscription obtained from the UI messages.

In one embodiment, the server 22 may be configured to parse metadata provided as a portion of one or more incoming messages from the external sources 46, and to process subscription subject related data in the incoming messages based at least in part on the content of the metadata of the incoming messages to identify specific data in the incoming messages, including data defining relationships between data of a subject ("parent data") for which data of other subjects ("dependent data") is provided, and the data of the other subjects. The dependent data may include static data and transactional data. For example, a message stream from an external source 46 that provides equity order data may include parent data of a particular share of stock, such as GOOGLE, and data specifying dependent data subjects for the parent data, such as the subjects of market price, volume, side (e.g., buy or sell), sale size and the like, for which data is respectively provided in the message stream. In another example, a message stream from an external source 46 providing market data may include parent data of a particular share of stock, such as GOOGLE, and data specifying dependent data subjects for the parent data, such as the subjects of bid price, offer price, last trade price, exchange and the like, as related to the parent data for which data is respectively provided in the message stream As discussed in detail below, the message stream from the external source 46 may contain data for a particular parent data and dependent data subject relationship that may be used to service subscribed to subjects of a unique subscription item in a client subscription.

In one embodiment, the server 22 may be configured to provide a web-based subscription management service that operates on a browser or desktop container, such as Openfin, and performs authentication functionalities to authenticate client devices 44.

Example Methods

For purposes of illustrating the features of the present disclosure, high level block diagrams of exemplary processes 100, 200 and 400, as shown respectively in FIGS. 3, 4 and 5, which advantageously minimize bandwidth usage on a communication network, usage of processing resources and memory, and processing latency, while providing subscription service management functionalities including real time dissemination of subscription data, are described below in connection with operations performed at components of the system 40 as shown in FIG. 2. The process 100 may control generating a data set of subscription subjects available for a client subscription and receiving and storing in memory data of the subjects of the data set. The process 200 may control displaying subjects of a data set available for a client subscription at a client device, receiving requests for a client subscription from a client device, determining a server subscription array including subscription items with respective subscribed to subjects based on the requests for the client subscription, generating UI messages including current data of subjects subscribed to and satisfying filter criteria according to a client subscription, and transmitting to a client device the UI messages from which a client view array including current data for the subjects subscribed to in the client subscription may be displayed at the client device. The process 400 may control generating a byte array including current data for subjects subscribed to according to a client subscription, based on data for subscription subjects received from external sources 46 and the data generator 48 and whether the data of the subscribed to subjects satisfies filter criteria for the client subscription. In one embodiment, the filter criteria may specify whether, for example, a particular user of an entity that has a client subscription for several users as clients is entitled to receive data of a subject subscribed to, or a current value of a subject subscribed to satisfies a requirement of being above, below or the same as a predetermined value.

Figure 3:
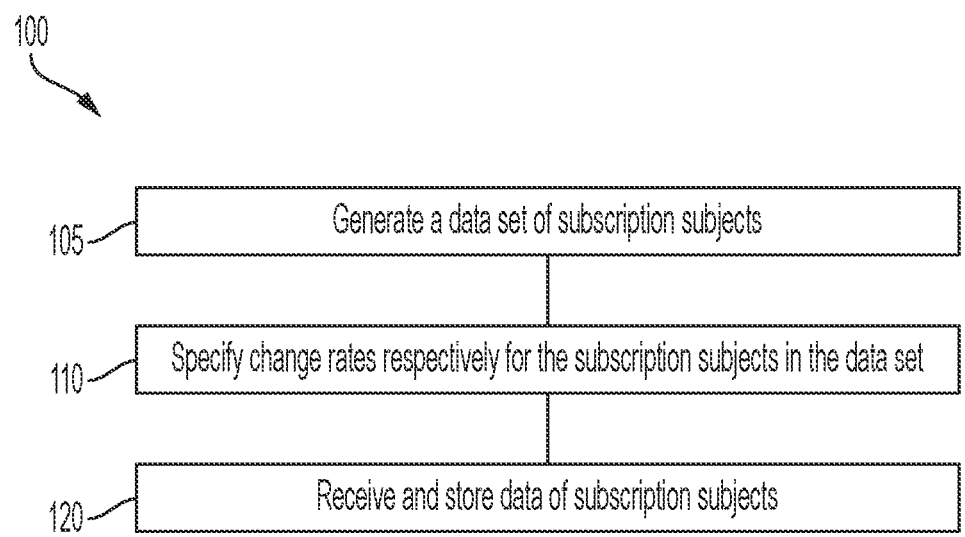
FIG. 3 illustrates an exemplary high level flow diagram of an exemplary method of providing for a subscription service, according to the present disclosure.

Referring to FIG. 3, in block 105, the server 22 may generate a data set of subscription subjects and store the data set with the subscription subjects in the memory 24 as subscription subject data 28. The data set may correspond to a particular category or type of data for which the server 22 receives data from a database or computing device, such as external sources 46. The data set including all of its subscription subjects may be configured for display as a two-dimensional array including columns corresponding to respective subjects of the data set, and as described in detail below, rows that may be used to create subscription items that form a client subscription. As described below, an individual row may correspond to a unique subscription item including a parent data subject to which dependent data subjects in the data set are mapped as related to the parent data subject and may be subscribed to in a client subscription.

In one embodiment, the data set may relate to financial instrument trading information and include subjects respectively containing static data and transactional data of financial instrument trading information. For example, the data set may be for subscription data related to equity orders and include subjects for which data may be provided in an incoming message stream EquityOrderRecord that includes data for the subject of an equity instrument, which constitutes the parent data, and additional data of other subjects in a dependent data relationship with the particular subject of the equity instrument. For example, the incoming message stream EquityOrderRecord may include a specific value corresponding to an equity financial instrument of GOOGLE stock as parent data, and dependent data subjects mapped by metadata to the specific value corresponding to GOOGLE stock, such as the dependent data subjects of current market price and number of shares purchased during the day of GOOGLE. In one embodiment, the incoming message stream EquityOrderRecord may include data EquityOrderClassKey that describes metadata that defines the dependent data subject relationship to the parent data subject, for example, a subject of the data set including a parent key for the parent data and child keys respectively for other subjects of the data set containing dependent data subject information, which includes dependent data metadata. For example, data for a parent data subject in an incoming message stream EquityOrderRecord may include metadata MarketDataClassKey and EquityInstrumentClassKey as child keys that defines the parent data subject as having two dependent data subjects, and the server 22 may use this metadata to associate with the parent data subject, new updated data of respective dependent data subjects received in an incoming message EquityOrderRecord that is related to the parent data subject.

In one embodiment of a data set of a financial instrument trading subscription service according to the present disclosure, dependent data subjects containing static data related to a parent data subject may, for example, include: an identifier of a financial instrument of interest, such as an equity financial instrument record ("TickerId"); a description of the financial instrument ("description"); user record creation information identifying the first name and last name of a client having a client subscription to receive certain financial information related to a financial instrument in the client subscription ("firstName" and "lastName"); an internal reference code of the apparatus 10 identifying a particular client ("viewCode"); a name of a trading book of the client that includes a particular financial instrument for which subscription data is provided to a client ("BookRecords"); and the date and time a client subscribed in a client subscription to receive certain information relating to a particular financial instrument of interest ("createDateTime"). In addition, dependent data subjects related to a parent data subject containing transactional data may include: a size of sales of a particular instrument at a particular time ("saleSize"); a value determined by a calculation performed at a preconfigured time interval, such as a few times per second, based on real time market data which changes more than a few times per second, such as a volume weighted average price for a financial instrument ("ivwap"); a nominal or face value of a financial instrument ("notional"); percentage of volume of trading for the financial instrument ("pov"); and a value calculated based on data provided from the generator 48 and data from one or more dependent data subjects. It is to be understood that the above identified subscription subjects are exemplary, and a data set of subjects concerning financial instrument trading information may include subjects for other financial instrument trading related information.

In block 110, the server 22 may specify, in metadata in the subscription subject data 28 stored in connection with the subjects of the data set in the memory, a subject in the data set array with a respective change rate corresponding to a frequency at which to update a display at a client device with a current value of the subject under a client subscription. The change rate, for example, may be one time or less per second, or many times per second. It is noted, however, that the value of data of a subject of the data set subscribed to in a client subscription may change more frequently than a change rate identified for the subject. For example, real time market data of a subject that is a market price of a particular financial instrument may change in real time at a rate much greater than a change rate specified for the subject.

In block 120, the server 22 may receive, over the communication network 18, from external sources 46, message streams of external data including data of or related to data of respective subjects of the data set. The data for the respective subjects may include, for example, real time clearing or settlement data, post trade data and current market price data for financial instruments and like financial trading information. The server 22 may extract data of respective subjects from the message streams for use in updating subjects subscribed to in a client subscription, as described below. In addition, the server 22 may store, in the memory 24 as the subscription subject data, the data for the respective subjects extracted from the message streams.

In one embodiment, in block 120, the server 22 may receive or acquire from the generator 48, data representing a calculation performed by the generator 48 and store the retrieved or acquired data as a value of a subject subscribed to in a client subscription, as described in detail below. The calculation may be performed at a preconfigured time interval using data of respective subjects of the data set. For example, the generator 48 may, every 500 milliseconds, calculate a value for the subject ivwap ("volume weighted average price") for a parent data subject of a particular equity instrument subscribed to from the data set, using the values respectively of subjects, such as market volume and last sale price of the particular equity instrument, which are updated more frequently than every 500 milliseconds, and provide the calculated value for the subject ivwap for the related subject of the particular equity instrument to the server 22.

Figure 4:
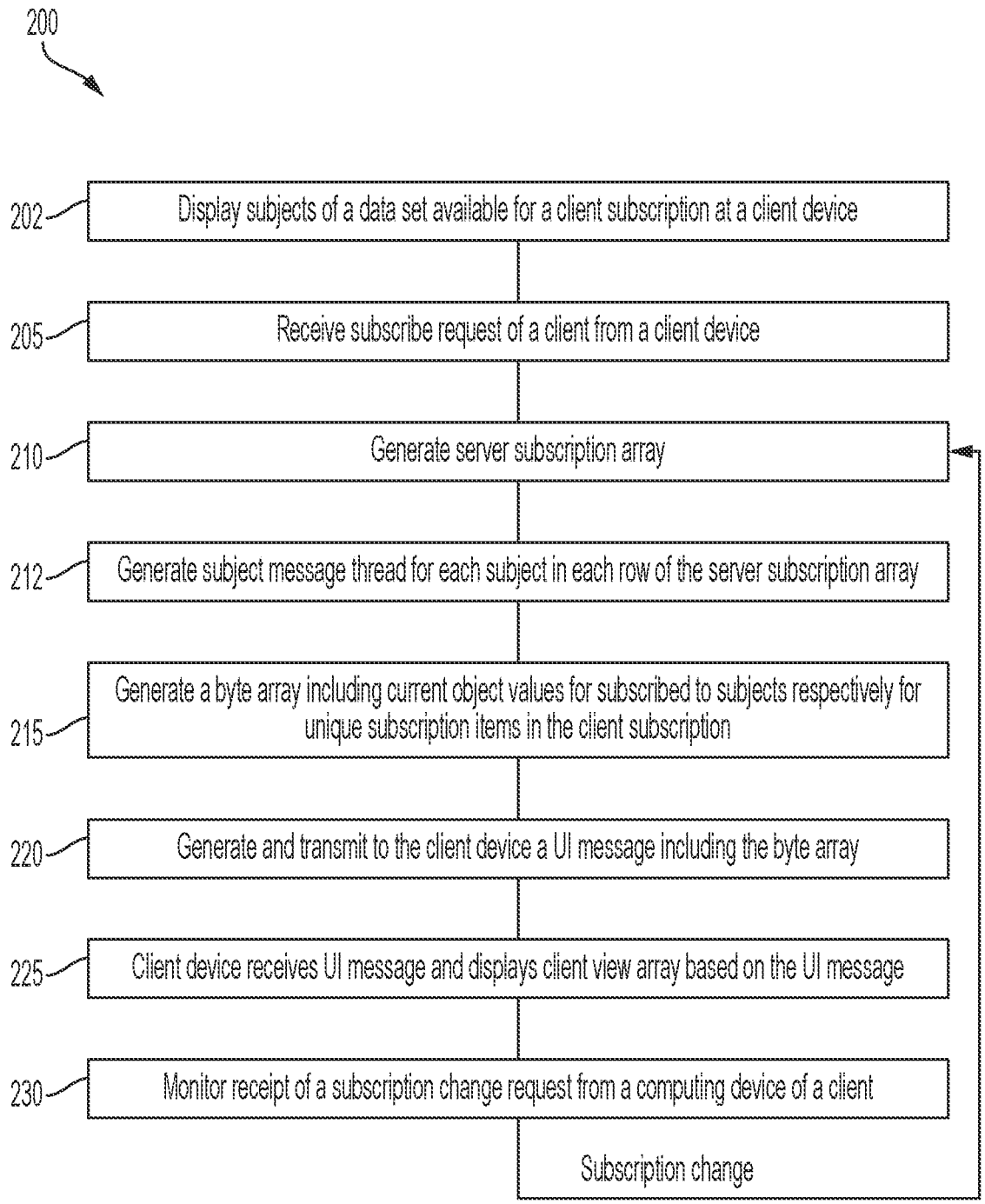
FIG. 4 illustrates an exemplary high level flow diagram of an exemplary method for subscription management processing, according to the present disclosure.

FIG. 4 illustrates the exemplary process 200 of creating, managing and servicing a client subscription, in accordance with the present disclosure.

Referring to FIG. 4, in block 202, the server 22 may transmit, over the communication network 18, to a client device 44 via a web-socket 45, data set information indicating subjects of a data set available for selection in a subscription service, and which causes display, at a graphical user interface (GUI) of a display of the client device 44, of a two-dimensional array ("data set array") including columns corresponding respectively to the subjects of the data set available for selection for a client subscription, and rows that may be used to specify subscription items having subscribed to subjects, to form a client subscription including the subscription items.

In one embodiment, a user of the client device may select particular subjects in a row of the data set array, such as by clicking on cells of the row on the GUI with a mouse pointer, to create a subscription item for a client subscription and become a client of a subscription data services contract with an owner or operator of a subscription service implemented at the apparatus 10 that services the client subscription. The contract may allow a client to receive current data of subjects of the data set subscribed to by the client as subscription items under the client subscription. When selection operations to the data set array on the GUI are performed to define subscription items of a client subscription, the client device 44 automatically may generate, and transmit over the communication network 18 to the server 22, a SUBSCRIBE command as a subscribe request in a subscription request message indicating selection of one or more subjects in one or more respective rows of the data set array for subscription items in a client subscription.

In one embodiment, a subscription request message including a SUBSCRIBE command may include the following data parameters: "type" which identifies the type of data set for which subscription services at the apparatus 10 is requested under a client subscription, for example, a data set including equities financial information; "BookName" which identifies a trade blotter of a client on which to display at a client device data provided for a client subscription; and "fields" which identifies subscribed to subjects of available subjects of the data set array for which the server 22 may provide data to a client device of the client to service a client subscription.

In one embodiment, the subscription service may be accessed at and provided to the client device 44 as a web service accessed via a browser. In another embodiment, the client device 44 may be configured to have an app or software instructions stored in its memory that controls exchange of data between the client device and the apparatus 10 to implement a subscription service, which includes displaying client subscription data at the client device and enabling a client to enter subscription request information to define a client subscription by selecting cells of an array displayed on a GUI provided from the apparatus 10.

In block 205, the server 22 may receive, over the communication network 18, from the client device 44 via the web-socket 45, a subscription request message indicating a subscribe request entered at the client device 44. In one embodiment, the server 22 may receive with the SUBSCRIBE command, or previously during a subscription registration session with a client via a client device 44, over the communication network 18, client data including: information identifying a group of users, such as traders, and a subscription entity, such as a brokerage firm of which the traders of the group are members, as a client(s) of a client subscription for financial trading information provided by the apparatus 10. The server 22 also may receive with the SUBSCRIBE command client-related data including specific financial instruments of interest for which subscription data is desired, and types of financial instruments of interest, such as equities, treasuries and the like, for which subscription data is desired. The server 22 may store, as client subscription data 26 in the memory 24, data included in the SUBSCRIBE command and any other client-related data.

In block 210, for each subscription request message including the SUBSCRIBE command received from a client, the server 22 may generate record data of subscription items including the subjects subscribed to as indicated in the subscription request message that may be represented in a server subscription array ("server array") that is a two-dimensional array, and store information defining the server array, which includes metadata defining parent data subject and dependent data subject relationships for respective subscription items, in the client subscription data 26. In one embodiment, a first element in each row of the server array may have a unique row identifier corresponding to a unique subscription item indicated by the SUBSCRIBE command. The unique subscription item may be associated with a parent data subject in the row mapped to dependent data subjects in the row. In one embodiment, a dependent data subject in the row may have one or more of its own dependent data subjects in the row. The server 22, for a unique subscription item in a client subscription, may determine that the parent subject data has a dependent data subject, based on metadata for the parent data subject.

In one embodiment, the server array may be configured to include subjects containing static data each identified with a unique parent key, subjects containing transactional data each identified with a unique parent key and optionally with one or more child keys that reference data of other subjects identified with the respective child keys, and subjects each identified with respective child keys. The server 22 may determine the value for a particular subject, by retrieving values of a respective child key(s) identified in metadata for the particular subject. For example, the server array defined from a data set for financial trading information may include the static data subject BookRecords identified with a parent key "bookRecordId" and the transactional data subject OrderRecords identified with a parent key. The data of the subject OrderRecords may be updated many times daily in real time based on changing external data, which includes data identified with the parent key "OrderId" and the child keys "bookrecord" and "customerid". The server 22 may determine the value of the subject OrderRecords, by retrieving the values of the subjects respectively corresponding to the child keys "bookrecord" and "customerid" indicated in the subject OrderRecords.

As discussed in detail below, the server 22 may use parent keys, child keys, dependent data and unique row identifiers, to generate and transmit a UI message including a byte array containing current data for subscribed to subjects, and include the parent keys, child keys and unique row identifiers in the UI message. In addition, a client device 44 may, based on the parent keys, child keys, dependent data and unique row identifiers received with UI messages, display a two-dimensional array as a client view array including current values of subjects subscribed to under the client subscription.

In one embodiment, for an equity order subscription service, the server 22 may configure data of a unique subscription item in a client subscription included in a subscription request message into the records EquityOrderRecord, EquityInstrumentRecord and CustomerRecord as follows:

```
EquityOrderRecord:
    ID = 1001
    InstrumentId = 12
    Side=B
    Qty= 100
    Price=101
    CustomerId=1;
EquityInstrumentRecord:
    ID = 12
    InstrumentId = 12
    InstrumentTicker=MSFT
    InstrumentName= Microsoft Corporation
    CustomerName – customer1
    Customer LongName – Bill Gates;
and
CustomerRecord:
    ID=1
    CustomerId=1
    Customer Name=Morgan Stanley.
```

The record "EquityOrderRecord" is an indicator that the subscription item in the client subscription is for an equity order, and may include as record items: "ID", which is a unique value identifying a unique subscription item in the equity order client subscription having subscribed to subjects; and the subscribed to subjects of: "InstrumentId", which is a value corresponding to an instrument and constitutes parent data; "Side", which has a value B meaning Buy or a value S meaning sell and constitutes dependent data; "Qty", which is a value equal to a number of shares for an order of an instrument corresponding to the InstrumentId value and constitutes dependent data; "Price", which is a value of the instrument corresponding to the InstrumentId value and constitutes dependent data; and "CustomerId", which is a value corresponding to a particular client and constitutes dependent data. In addition, the record "EquityInstrumentRecord" is an indicator of instrument information associated with the EquityOrderRecord for the subscription item, and may include as record items: "ID", which is a unique value identifying a record of a unique equity instrument of multiple equity instruments available for a client subscription; "InstrumentId", which is a value corresponding to an instrument of the subscription item and constitutes parent data; "InstrumentTicker" which is an abbreviation of the instrument corresponding to the InstrumentId value and constitutes dependent data; "InstrumentName", which is a full name of the instrument corresponding to the InstrumentId value and constitutes dependent data; "CustomerName", which is a name of a client corresponding to the "CustomerId" value and constitutes dependent data; and "Customer LongName", which is the full name of the client corresponding to the "CustomerId" value and constitutes dependent data. Further, the record "CustomerRecord" is an indicator of customer information associated with the EquityOrderRecord for the subscription item, and may include as record items: "ID", which is a unique value identifying a record of a unique client of multiple client that may be associated with a client subscription; "CustomerId", which is a value corresponding to a particular client and constitutes dependent data; and "Customer Name", which is a name of a client corresponding to the "CustomerId" value and constitutes dependent data. In the EquityOrderRecord, the InstrumentId subject is parent data that is mapped to the child keys of dependent data subjects "InstrumentTicker" and "InstrumentName"; and the CustomerId subject is dependent data that is mapped to child keys of dependent data subjects "CustomerName" and "Customer LongName" in the EquityInstrumentRecord, and dependent data subject "CustomerName" in the CustomerRecord. FIG. 6 illustrates an exemplary server array including the above example of a subscription item for an equity order, and other exemplary unique subscription items that may constitute respective equity order records in a client subscription represented in the configuration of an array. It is to be understood that a server array representative of a client subscription may include many other subjects for respective unique subscription items.

In one embodiment, for a market data subscription service, the server 22 may configure data corresponding to a unique subscription item in a client subscription included in a subscription request message into the records EquityInstrumentRecord and MarketDataRecord as follows:

```
Equity InstrumentRecord
ID= 12
InstrumentId = 12
Exchange=NASD
Instrument Ticker=MSFT
Instrument Name=Microsoft Corporation;
and
MarketDataRecord
ID= 12
InstrumentId = 12
Bid=143.56
Offer=144.56
Last Trade=143.56.
```

The record "EquityInstrumentRecord" is an indicator of instrument information that may be for a subscription item in a client subscription, and may include as record items: "ID", which is a unique value identifying a record of a unique equity instrument of multiple equity instruments available for a client subscription: "InstrumentId", which is a value corresponding to an instrument of a subscription item and constitutes parent data; "Bid", which is a market value of an offer to buy the instrument corresponding to the value of the instrument identifier and constitutes dependent data; "Exchange", which is a name of the exchange on which market data for the instrument corresponding to the InstrumentId value is obtained and constitutes dependent data; "Instrument Ticker" which is an abbreviation of the instrument corresponding to the InstrumentId value and constitutes dependent data; and "Instrument Name", which a full name of the instrument corresponding to the InstrumentId value and constitutes dependent data. In addition, the record "MarketDataRecord" is an indicator of customer information associated with the EquityInstrumentRecord for the subscription item, and may include as record items: "ID", which is a unique value identifying a record of unique market data instrument of multiple market data instruments that may be in a client subscription; "InstrumentId", which is a value corresponding to an instrument of a subscription item and constitutes parent data; "Bid", which is a market value of an offer to buy the instrument corresponding to the InstrumentId value and constitutes dependent data; "Offer", which is a market value of an offer to sell the instrument corresponding to the InstrumentId value and constitutes dependent data; and "Last Trade", which is a price at which the instrument corresponding to the InstrumentId value was last sold and constitutes dependent data. The InstrumentId subject in the EquityInstrumentRecord is parent data that is mapped to child keys of dependent data subjects "Instrument Ticker" and "Instrument Name", and child keys of dependent data subjects "Bid", "Offer" and "Last Trade" in the "MarketDataRecord." FIG. 7 illustrates an exemplary server array including the above example of a subscription item, and other exemplary unique subscription items that may constitute respective instrument records in a client subscription for an EquityInstrumentRecord represented in the configuration of an array.

Referring to the above examples, relationships between data of subjects of different data sets, for example an equity order subscription having EquityOrderRecords and a market data subscription service having EquityInstrumentRecords as described above, may be indicated in the metadata for the records of unique subscription items, to provide that data for a given InstrumentId value in EquityInstrumentRecords, for example InstrumentId=12, may be used as the data for an EquityOrderRecord having the same InstrumentId value, namely, InstrumentId=12. Advantageously, based on the parent and child key data relationships indicated in the metadata, the server 22 may, based on the metadata, use data (such as the value) of a subject from one data set as the value of a same subject in another data set, to avoid data redundancy in processing and transmitting values of subjects subscribed to in a client subscription for display in a client view array at a client device.

In one embodiment, a subscription request message including a SUBSCRIBE command received as described in block 205 may include the following data parameters: "sort" which specifies an order to display subjects (i.e., columns) of the server array subscribed to in a client view array across a trade blotter at a client device of the client; and "columnFilters" which set forth filter criteria that the server 22 may use to determine whether to transmit, under the client subscription, data of a row of the server array, or data of respective subjects of the row. The filter criteria may include a determination whether an object value of a subject in a particular row of the server array is above, equal to or below a preconfigured or dynamically changeable value or includes certain text characters. In one embodiment, columnFilters may include logical AND or operations; a group start (GS) operation which defines parameters for a group of records to be provided, for example, rows where the subject "quantity" has a value exceeding or below a threshold and the subject "side" has a value "Buy"; a "starts with" operation; and a "contains" operation.

In one embodiment, the server 22 may use data of a subject "BookName" to differentiate among several trade blotters that a client can use at the client device 44 to display different subscription data. For example, the client may have different trade blotters that display data, from a same, single data set subscribed to, respectively with different other subjects of the server array corresponding to the single data set. In one embodiment, the subjects subscribed to in a client subscription may be none or all subjects from the data set constituting the server array.

In one embodiment, the server array may be generated to permit the following column operations by the server 22 to generate a modified server array for display as a client view array: filter a column, i.e., identify values of a subject of the subscribed to subjects in different rows of the server array and remove any row for which the value of the subject does not satisfy column filter criteria; sort and arrange columns of the server array as desired; and sort or aggregate a group of columns, such as sum or average values of the same subject in multiple rows, and include a result of the aggregation as an object value in a different subject (column) of another row of the server array. The column operations described above, or other column operations, may be indicated in the subscription request message and any resulting aggregation of columns may constitute a subscribed to subject.

In one embodiment, a server array may be represented in the memory using a data structure having a JSON format or format compatible with JSON. The data structure may include a first data element [0] that is always reserved for a unique row identifier of a row of a server array, and data elements succeeding data element [0] that correspond to subjects subscribed to having indices of the respective columns of the server array in the row having the unique row identifier. For example in a financial trading subscription management system, a data structure stored in the memory that represents a server array and may be used to generate a client view array for display at a client device, may be (i) EquityOrderRecord data[0]=ID, where the rows of the server array correspond to specific equity order items of the client; or EquityTradeRecord data[0]=ID, where the rows of the server array correspond to specific equity trade items of the client. In addition, for example, where the subjects identified in the subscription message include only "side" and "qty", the data structure representing the server array may indicate the column indices, i.e., at what columns, in the server array the subjects "side" and "qty" are located, for example [33, 199] or columns 33 and 199 of the server array. Consequently, in accordance with the data structure format for generating, from the server array, for a particular row, i.e., unique subscription item, for an EquityOrderRecord, the data structure may indicate that the object values respectively for the subscribed to subjects are at index 33 of the server array, i.e., the column of the server array having the index 33, for the subject "side", and index 199 of the server array, i.e., the column of the server array having the index 199, for the subject "qty". Advantageously, this simple and succinct representation of the locations in a row of the server array from which to obtain object values in accordance with the data structure of the present disclosure, permits random access to object values from data of the subscribed to subjects of the server array, quickly and using reduced processing resources and less memory space. For example, the data structure [EquityOrderRecord[33], EquityOrderRecord[199]] may be used to retrieve from the server array of EquityOrderRecord, for each row identifier, i.e., ID, current object values for the subjects "side" and "qty" subscribed to under the client subscription.

In one embodiment, the server array may include the subscribed to subjects arranged in an order and having object values of data length indicated in the subscription request message.

In one embodiment, when the SUBSCRIBE command identifies a subject not in a specific data set, the server 22 may generate a blank entry " " for the subject.

In one embodiment, as discussed below, in block 210 the server 22 may generate a server array based on subjects indicated in a subscription change request as received in block 230.

Referring to FIG. 4, in block 212, the server 22 may generate, for each subject in a row of the server array, a subject message thread identified with the unique row identifier for the row and identifying, such as with metadata, memory location(s) at which a current value for the subject may be retrieved or determined. Each of the subjects in each row of the server array thus may have a value in a respective subject message thread.

In one embodiment, for each subject message thread corresponding to a subject in a row of the server array, where the row corresponds to a unique subscription item, the subject message thread may include or indicate a change rate indicating a time interval that specifies a rate at which the server 22 processes the subject message thread to retrieve a current value of the subject, for initially displaying client subscription data of a client subscription as a client view array at the client device, or updating a display of the client subscription data of the client subscription in the client view array at the client device to reflect any change to the current value of the subject. The server 22 may maintain and control operation of an electronic timer that counts down a time interval for the subject of each of the subject message threads according to the change rate for the subject of the subject message thread. The server 22 may store a representation of each subject message thread, including the change rate of the subject associated therewith, as the client subscription data 26 in the memory.

The storage of object values of subjects for respective subscription items in the form of the server array and use of subject message threads to store and track updates to data of respective subjects according to the present disclosure, advantageously permits the server 22 to retrieve by random access object values of respective subjects in the server array subscribed to by a client under a client subscription, which in turn increases speed of processing subscription subject data and displaying to a client at a client device a client view array with updated data of subjects subscribed to by the client, and also allows a server to dynamically change a client subscription, and thus the data of subjects displayed to the client as a client view array based on the client subscription, with minimal processing and data storage resource usage.

In block 215, the server 22 may generate, based on a current state of the client subscription, a byte array including current object values for subscribed to subjects respectively for each unique subscription item in the client subscription. The byte array may include only subjects subscribed to as indicated in the server array and object values respectively of the subscribed to subjects. For example, the server array may include 250 subjects, and the byte array may only have 10 subjects of the 250 subjects, based on application of filter criteria as discussed below.

Figure 5A:
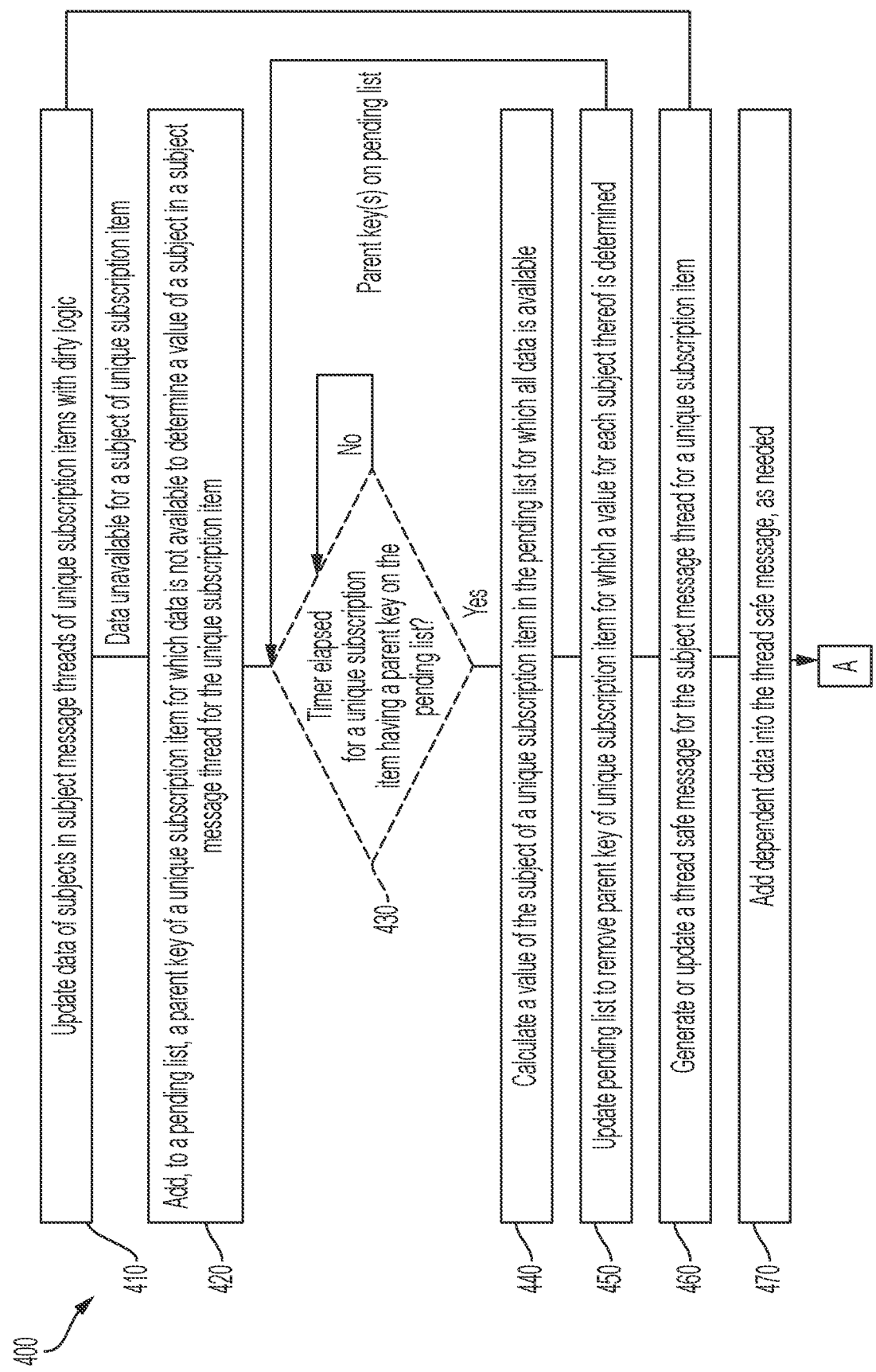
FIGS. 5A, 5B and 5C illustrate an exemplary high level flow diagram of a method for generating a byte array including subscription data for a client subscription, according to the present disclosure.
Figure 5B:
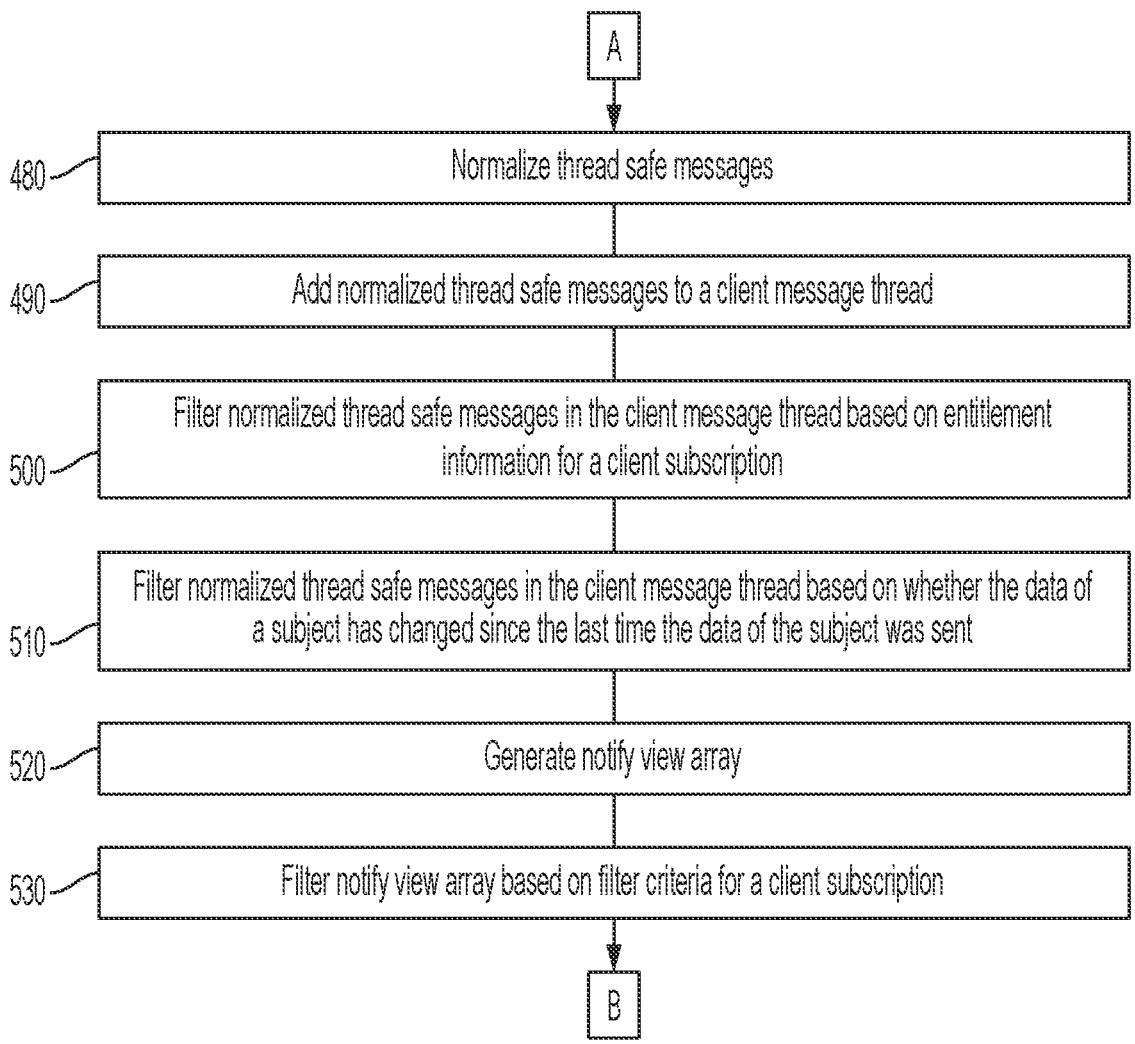
Figure 5C:
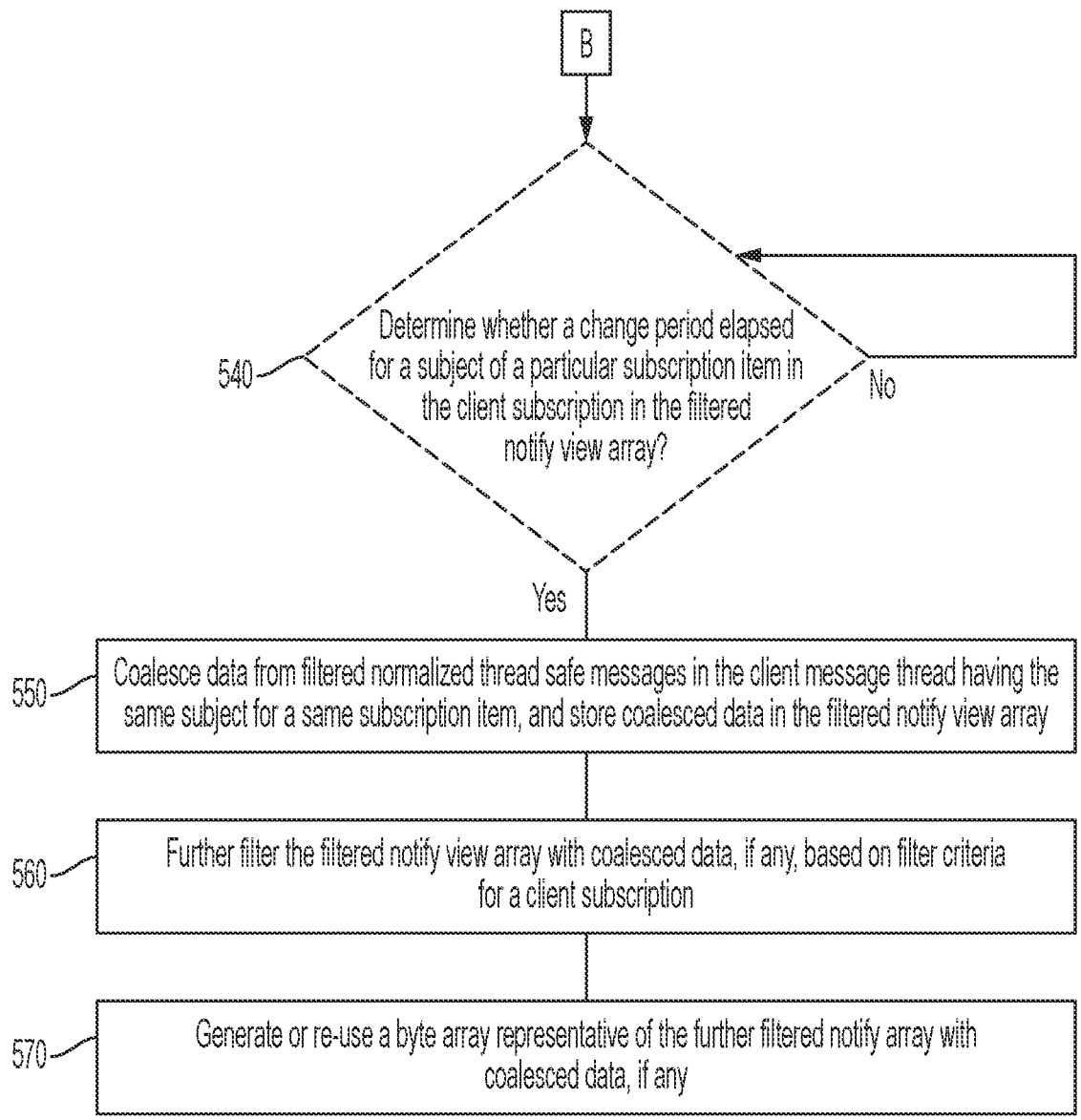

Referring to FIGS. 5A, 5B and 5C, the server 22 may perform a process 400 that manages storing data of subscribed to subjects of the server array, and processing data of the subscribed to subjects, to generate in block 215 a byte array including current data of subjects subscribed to according to change rates specified for the subjects, and filtered according to filter criteria that may be preset and dynamically changed by a client.

In block 410, the server 22 may continuously update the data in a subject message thread for a particular subject of a row corresponding to a unique subscription item of the server array, as updated data for the particular subject becomes available. For example, the updated data may be based on external data received from an external source 46 or internal data generated at the data generator 48. In one embodiment, the server 22 may determine that an incoming message stream from an external source 46 includes data for a particular row of the server array, and extract from the message stream data for the subject of the particular row. In addition, the server 22 may store metadata, a flag or the like with the subject message thread representing: whether the value of the subject changed; whether the change occurred over a predetermined period of time since the last time the object value for the subject of the subject message thread was provided to a client device to service a client subscription; a number times the object value for the subject changed within the predetermined period of time; and the different object values that existed for the subject over the predetermined period of time. In one embodiment, an indication of whether the object value changed for the subject in the predetermined period of time and different values of the object value for the subject that existed during the predetermined period of time may be stored in a changelist associated with a subject message thread as so-called dirty logic. In one embodiment, the changelist may be stored as the client subscription data in the memory together with any new values to which the data of the subject changed.

In one embodiment, the server 22 may receive or acquire from the generator 48, data representing a calculation performed by the generator 48 for a subject in a particular row of the server array, and store the data in the subject message thread for the subject of the particular row. For example, the generator 48 may calculate a value for the subject ivwap ("volume weighted average price") for a particular row in the server array every 500 milliseconds, using the values respectively of subjects, such as market volume and last sale price of the particular row, which are updated more frequently than every 500 milliseconds, and provide the calculated value to the server 22 for inclusion in the subject message thread for the subject ivwap for the particular row. In one embodiment, the server 22 in block 410 may determine whether data is available to determine a value for a particular subject of a subject message thread which is for a unique subscription item. For example, the value of a subject for a particular ID, as a unique subscription item, may be determined based on a calculation that uses data from other subjects or otherwise ("external data"), such as market data, and the server 22 may determine whether the data needed for the calculation is available. When the server 22 in block 410 determines that the data is not available to determine the value of at least one subject for the particular ID, the server 22 may perform processing in accordance with blocks 420, 430, 440 and 450.

In block 420, the server 22 may add to a pending list a parent key of a unique subscription item, which has a unique ID value, for which data to determine the value of at least one subject of the unique subscription item is unavailable. The inclusion of the parent key in the pending list may indicate that, for a unique subscription item, data needs to be retrieved and then used to determine a value for at least one subject to be included in a respective subject message thread for the unique subscription item. The pending list may be stored as metadata of or associated with the unique ID value of the unique subscription item, or in the memory, as the client subscription data.

In block 430, the server 22 may control timing of a time period, by an electronic timer, for each unique subscription item having a parent key in the pending list and determine when the time period being timed by the timer is elapsed. If the time period respectively for a unique subscription item having a parent key in the pending list has not elapsed, the server 22 may continue to monitor the timer until the time period elapses. When the server determines the time period has elapsed, the server 22 in block 430 may perform further processing to determine whether the necessary data, which was not previously available, to determine a value for a subject of the unique subscription item is now available. In addition, if the server 22 determines that the necessary data to determine a value for at least one subject of the unique subscription item with a parent key in the pending list is not available, the server 22 may restart timing of a time period by the electronic timer for the unique subscription item. As discussed above, the external data from which a data of a subject of a subject message thread is calculated may be provided or become available at various rates, such as many times a second, and the value of the subject dependent on the external data may be calculated at a faster or different rate than the rate at which the external data becomes available.

In block 440, for a subject of a unique subscription item on the pending list for which all data necessary to calculate a value of the subject is determined to now be available at block 430, the server 22 may retrieve the necessary data and calculate a value for the subject based on the retrieved necessary data.

In block 450, the server 22 may remove a parent key of a unique subscription item from the pending list when a value for all subjects as dependent data subjects that depend on the parent data subjects of the unique subscription item has been determined. If a value of at least one subject of a unique subscription item has not yet been determined based on the unavailability of data to determine the value, the parent key of the unique subscription item may be maintained on the pending list and processing continues in block 430.

As discussed above, the pending list may indicate those unique subscription items for which a value for at least one subject thereof cannot be determined because data necessary to determine the value is not yet available.

In one embodiment of processing in blocks 420, 430 and 440, for example, a unique subscription item having a subject of a financial instrument, such as GOOGLE stock, as a parent subject data may have the subject "pov" (percentage of volume trading") as dependent data that is calculated based on market data. The subject pov may be defined to depend on a dependent data subject OrderCalc. The server 22 may determine that a value of the subject OrderCalc is needed to determine a value for the subject pov, attempt to retrieve the value of the subject OrderCalc and determine that no value is available for the subject OrderCalc because the market data which is needed to perform the calculation of OrderCalc is not yet available. In this circumstance, the server 22 may tag the unique ID value of the unique subscription item in metadata as incomplete, because additional data is needed to determine the subject pov, add the parent key of the unique ID value to a pending list and begin timing a time period, such as 500 milliseconds, specific to the subject pov for the unique ID value. When the server 22 determines the time period being timed for the subject pov for the unique ID value is elapsed, the server 22 may determine whether market data needed for the calculation specified for the subject OrderCalc, where the value of the subject pov is determined using the result of the calculation for the subject OrderCalc, is available. The server 22, in particular, may determine whether all of the data necessary to perform the OrderCalc calculation is available, i.e., all the market data necessary for the calculation of OrderCalc is available, and only when all the data necessary for the calculation is available, the server 22 may remove the parent key of the unique ID value from the pending list when there are no other subjects associated with the unique ID value for which data is not available. In other words, the parent key of the unique ID value may be removed from the pending list when a value for all subjects for the unique ID value can be determined. In the event there is a subject of the unique ID value for which data necessary to determine the value thereof is not available, the server 22 may continue with processing at block 430, similarly as described above, until a value is determined for all subjects associated with the unique ID value, at which time the parent key of the unique ID value is removed from the pending list in block 450. In addition, the server 22, after determining, for this unique ID value, the value of the subject pov, may add the value to the respective subject message thread for the unique ID value.

In block 460, the server 22 may generate a thread safe message for a subject of a subject message thread for a client subscription, based on a current value of a subject in the subject message thread, if a thread safe message for the subject of a subject message thread was not previously generated. As described above, the value of the subject may be based on a calculation in block 440 when the time period being timed last expired, or the value of the subject in the subject message thread as last updated in block 410. The thread safe message may indicate a particular row identifier, i.e., unique ID value, of the server array to which the value of the subject thereof corresponds, and metadata indicating a time or version of the subject message thread at which the data for the subject was calculated when the time period for the subject last elapsed in block 430 and information of the changelist, if any, for the subject.

In one embodiment, the server 22 may store data extracted from an incoming message as a value of a subject referenced in a subject message thread, in a thread safe message as a message object of a first type, where the actual value of the subject is an object, and a second type, where the actual value is a string or other things that cannot be upscaled to longs, to avoid autoboxing within Java. In this embodiment, the server 22 may readily move data, as received in incoming messages, between different message object types, for example, thread safe messages, avoiding autoboxing and as a result retaining the original meaning of the content of the incoming message.

Alternatively, in block 460, if a thread safe message for a subject of a subject message thread was previously generated, when the server 22 detects an update to the value of the subject message thread, the server 22 may change only the data of the subject in the thread safe message to the current updated value in the subject message thread.

In block 470, the server 22 may add to a thread safe message that does not include dependent data, which may exist when a thread safe message is initially generated for a client subscription or a modified client subscription, dependent data for the subject of the thread safe message that is static data. In the event thread safe messages for a client subscription already include static dependent data, the server 22 may skip processing of block 470 and restart processing in block 480. The static dependent data, which is specified by parent data for the subject of the thread safe message, may be added only a single time for the thread safe message, and contain a value of a particular subject for a specific row identifier, i.e., unique ID value, of the server array. In one embodiment, the static dependent data may contain a value of a subject determined based on values of respective other subjects in a particular row of the server array. For example, the subject of the thread safe message may be the price of the stock GOOGLE, which corresponds to a unique ID value of a unique subscription item of the client subscription, and the data of the thread safe subject message may define a relationship between the parent data subject of the thread safe massage with a dependent data subject. For an exemplary server array, the particular financial instrument (GOOGLE stock) may be a value of the subject in a particular row which has the row identifier of the unique ID value and further includes static dependent data of a value of a subject "side".

For example, a thread safe message for a subject of a unique subscription item may include dependent data subjects of values corresponding to a trader that is a client of the client subscription (User), an entity to which a client belongs and is included in the client subscription (Firm), and a trading desk at the which the trader trades (Desk). The server 22 may add dependent message data, such as the subject "Desk", to the thread safe message to permit sorting and filtering of values of subjects in thread safe messages that results in generation of a client view array with only the data of interest for the client subscription being displayed at the client device.

In block 480, the server 22 may perform normalization processing on data of subjects of each of the thread safe messages, including the dependent data, to obtain a uniform data format for each thread safe message. The normalization may be performed because the data from different external sources 46, from which data of the subjects is obtained and calculated, may be of different formats. The normalization of the data format of data in the thread safe messages may permit the values for the respective subjects to be used, without further processing, by a client device, to populate cells of a two-dimensional array with the values of the respective subjects for display as a client view array at the client device.

In one embodiment, a normalized thread safe message may include time or version information indicating sequence of creation thereof, based on a current data value in a subject message thread for a respective subject for a particular row of the server array.

In block 490, the server 22 may generate a client message thread, if not already created, and add to the client message thread the normalized thread safe messages for a client subscription. Each normalized thread safe message may be identified in the client message thread with metadata indicating the particular client subscription and describing a parent subject data and dependent subject data relationship for the subject(s) of the normalized thread safe message. The client message thread may include normalized thread safe messages for one or more client subscriptions for a particular client. In addition, a client subscription may be part of a group subscription for which several users are authorized to receive certain subjects based on entitlement information in the client subscription. The server 22 may add the normalized thread safe messages to the client message thread as soon as the normalized thread safe messages are generated. The client message thread may be saved as client subscription data in the memory 24.

In block 500, the server 22 may determine whether to provide the value of a subject of a particular normalized thread safe message in the client message thread to a client for display in a client view array, in accordance with entitlement information associated with the client subscription. For example, the client subscription may be for an entity including several users, and include entitlement information that specifies which, if any, of the users is entitled to receive particular subjects under the client subscription. When the server 22 determines that a particular normalized thread safe message in the client message thread satisfies entitlement criteria for the client, the server 22 may allow the normalized thread safe message to remain in the client message thread. Alternatively, when the server 22 determines that a particular normalized thread safe message in the client message thread does not satisfy entitlement criteria for the client, the server 22 may filter the client message thread by removing the normalized thread safe message from the client message thread.

In block 510, the server 22 may determine whether the data of the subject for a particular row (i.e., unique ID value) of the server array indicated in a normalized thread safe message in the client message thread has changed since the last time data for the subject of the particular row identified in the normalized thread safe message was provided to the client device for display in a client view array. In one embodiment, the server 22 may extract from the normalized thread safe message in the client message thread any changelist information associated therewith indicating whether the data of the subject in the normalized thread safe message is different from the data of the subject for the particular row of the server array that was last provided to the client device for display in the client view array. When a client view array has not been provided to a client device for a client subscription, the changelist information may have a same indicator as an indicator indicating that the data of the subject is different from the last time the data was provided for the subject. When the server 22 determines that the changelist information includes an indicator indicating that the data of the subject is different from the last time the data was provided for the subject, the server 22 may allow the normalized thread safe message to remain in the client message thread. When the changelist information includes an indicator indicating that the data of the subject is unchanged, the server 22 may filter the client message thread to remove the normalized thread safe message from the client message thread.

In block 520, the server 22 may generate an array of client subscription data ("notify view array") for the client subscription, using the data of the subjects of the respective normalized thread safe messages for the client subscription in the client message thread after the filtering of blocks 500 and 510, and store the notify view array in the memory 24 as the client subscription data. The notify view array may represent a pre-compiled version of a client view array that would be displayed at a client device and have a configuration similar to and reflective of the client view array actually displayed at the client device. In addition, the notify view array may undergo further processing to eliminate unwanted data and generate aggregation data, which would determine the data of subjects and define the configuration of the client view array.

In block 530, the server 22 may filter or configure data in the notify view array based on current filter criteria for the client subscription. The filter criteria may be specified with a SUBSCRIBE command that establishes a client subscription or received from the client via a client device after the subscription is established. The filter criteria may be stored in the client subscription data, such as in metadata associated with subjects of the client subscription. As described above, the filter criteria may specify whether the data of a subject, such as a value or text in a column of the notify view array, for a particular row, i.e., a unique ID value of the client subscription for which related data is subscribed to under the client subscription, should be displayed in a client view array on the client device. In particular, the filter criteria may specify whether the data of the subject for a particular row, in other words, a cell in the notify view array corresponding to a row of a unique ID value in the client subscription, should remain in the notify view array. The filter criteria may, for example, include column filter criteria specifying that (i) a value of the subject must be above, equal to or below a specified value, where the specified value may be determined from a specified logical operation(s), or (ii) data of the subject must include certain, or a certain configuration of, text characters, for example, certain text characters must be at the beginning or a specified location within the object value in the cell of the notify view array corresponding to the subject. When the server 22 determines that the data for the subject satisfies the current column filter criteria, the server 22 does not change the notify view array. When the server 22 determines that the data of the subject does not satisfy the current column filter criteria, the server 22 may filter the notify view array to remove therefrom a row having a value for the subject in the row that does not satisfy the column filter criteria. Effectively, filtering of the notify view array using column filter criteria may remove a row therefrom, such that client view array displayed on a client device does not include the row corresponding to a unique ID value of the client subscription.

In one embodiment, in block 530 the server 22 may sort columns of the notify view array in an order specified in the filter criteria. For example, based on the filter criteria, the server 22 may process the data of the notify view array to have the columns appear horizontally across the notify view array in an order specified from the left to right, such that this order of columns (i.e., subjects) would identically exist across the client view array.

In one embodiment, the filter criteria may specify to aggregate values of the subjects of respective rows of the notify view array and display the aggregated values in a new row in the notify view array. For example, the server 22 may configure the notify view array, according to filter criteria, to group multiple rows together and define a new row having an accumulation of values of cells of multiple rows grouped together. For example, values of a subject "sharessold" in multiple rows of a notify view array may be summed and reflected in a subject of another row of the notify view array, and thus in turn in the client view array, that is for aggregated trading data. It to be understood that values in columns for multiple rows may be aggregated in any of a variety of ways and included in a new row in the notify view array as part of the filtering. Advantageously, the filtering in block 530 may eliminate rows of the notify view array, to reduce the total amount of data being processed and stored in memory at the apparatus 10 for servicing a client subscription, and also reduce the bandwidth necessary to communicate the data that services a client subscription to a client device. In addition, the client device may display a client view array using less processing and memory storage, as a result of the filtering.

In block 540, the server 22 may determine whether a change period the server 22 is timing with an electronic timer for a subject subscribed to for a particular subscription item in the client subscription and currently included in the filtered notify view array has elapsed. The change period for each subject corresponds to a change rate specified for the subject. For example, the change period is 0.5 sec when the change rate is one time every 0.5 second. If the change period has not elapsed, the server 22 may continue to monitor the timer until the change period elapses. If the change period has elapsed, the server 22 may perform the operations of block 550. In addition, after the change period being timed has elapsed, the server 22 may restart timing of a change period by the electronic timer for the subject. As discussed above, the data of a subject in a client subscription may be updated at various rates, such as many times a second, where the rates of updating are different from a change rate specified for the subject, such that the client message thread may include multiple filtered normalized thread safe messages for the same subject arranged in chronological order, with the most recent filtered normalized thread safe message for the same subject last in the order of the filtered normalized thread safe messages for the same subject. In one embodiment, data for a same subject for a unique ID value in multiple filtered normalized thread safe messages in the client message thread may be stored in the memory 24 in a stack of a data structure, in chronological order based on a time that the filtered normalized thread safe messages are added to the client message thread.

In one embodiment, the subjects of a server array may have several different change rates, such as three, and the timing of a change period for the subjects may be synchronized such that change periods that are identical are timed concurrently. In this manner, the client view array may be updated, as needed, at three different intervals corresponding to the three change rates.

In one embodiment, the change period may be configurable for a subject, and the timing for all change periods may be initiated when servicing of a client subscription initiated.

In block 550, for a subject that is dependent data of a unique ID value for which the change period timer elapsed, the server 22 may identify each filtered normalized thread safe message for the same subject and unique ID value in the client message thread and determine, from, for example, metadata associated with or within the identified filtered normalized thread safe messages, a latest or most recent data of the subject of the unique ID value from the identified filtered normalized thread safe messages, since the last time that data of the subject for the unique ID value, if any, was retrieved from the client message thread or provided to the client device as part of a client view array. In one embodiment, multiple values for the subject may be obtained from the stack of the data structure corresponding to the subject of the unique ID value. The server 22 may save the latest data for the subject of the unique ID value in the corresponding row of the notify view array. The notify view array may thus be updated to coalesce all data for the subject for a particular row of the server array currently in the client message thread into a single value for the subject for the unique ID value that may be provided to the client for display as a client view array according to the client subscription. Alternatively, if the client message thread does not contain filtered normalized thread safe messages for the same subject, the notify view array may not be modified for the same subject.

In block 560, the server 22 may further filter data in the filtered notify view array obtained in block 550, based on the current filter criteria for the client subscription. The filtering may be performed similarly as described in block 530. In one embodiment, the filter criteria used to filter in block 560 may differ from the filter criteria used in block 530, based on updated filter criteria received from a client device between the filtering performed in block 530 and the filtering performed in block 560.

In block 570 the server 22 may generate or reuse a byte array representative of the notify view array of block 560. When a UI message representative of a notify view array of block 560 including all values of subjects satisfying the parameters of the client subscription has not yet been sent to a client device for a client subscription, the server 22 may generate a byte array for the first time for the client subscription based on the notify view array of block 560. When another, modified notify view array for the client subscription (assuming the client subscription is unchanged) is generated at block 560, the same byte array as previously generated may be used and suitably modified based on changed values, if any, for subjects included in the notify view array of block 560. In one embodiment, a portion of the previously generated byte array may be used, for example, where the server 22 eliminated a row from the previously generated notify view array based on filter criteria, such as changed column filter criteria. Thus, where a client view array has not yet been displayed for a client subscription at a client device, the notify view array of block 560 may include all values of subjects satisfying the parameters of the client subscription, including current filter criteria.

In one embodiment, the server 22 may include or modify metadata in the byte array to indicate whether the byte array is for a client subscription for which a UI message representative of a notify view array has not been sent or previously has been sent to a client device.

In one embodiment, the byte array may include metadata indicating whether a particular row corresponding to a unique subscription item which was present in the last generated notify view array of block 560 is no longer in the currently generated notify view array of block 560. In one embodiment, the byte array may include, for each unique ID value, a subject that indicates whether the unique ID value, in other words, the row of the server array for the unique ID value, no longer satisfies filter criteria.

In one embodiment, the server 22 may generate the byte array as a data structure including a unique ID value for each row of the notify view array of block 560. The server 22 may use the unique ID value to retrieve, by random access, from the corresponding filtered normalized thread safe messages of respective subjects represented in the server array included in the client message thread, data for the subjects for each row of the notify view array of block 560. For example, a particular row of the server array for the EquityOrderRecord may be represented in the memory 24 with the data structure [10, 33, 199, . . . ], and the server 22, processing this data structure, may dynamically access and retrieve, for the row of the notify view array corresponding to a row identifier "10", the object values in the row which are indicated at the cells in the notify view array at the columns having the indices [33] and [199]. The server 22 may then populate the byte array with the object values retrieved at corresponding cell locations in the notify view array, namely, the byte array having the unique ID value 10 is populated with the object values retrieved at the indices [33] and [199] of the notify view array corresponding to the subjects (columns) "side" and "qty", respectively. Advantageously, this data format for the byte array, which may be in JSON format, minimizes the amount of data that needs to be transmitted over the communication network and processed to generate a client view array at a client device.

In one embodiment, subjects whose object values are text may be represented as numeric values in the server array, and thus the byte array, to reduce size of a UI message including the byte array transmitted over a communication network, and furthermore permit use of less memory resources at the server 22 and client device(s). For example, a subject indicating a side of financial transaction may have the value 1 or 0 included in the byte array of the UI message to represent whether the subject is BUY or SELL, respectively.

Referring again to FIG. 4, in block 220, the server 22 may generate a UI message including a byte array of block 570 containing values in a notify view array for display at a client device as a client view array.

In block 220, when the notify view array is generated initially for a client subscription, in other words, when a client view array has not yet been displayed at a client device based on a client subscription established with the apparatus 10, the server 22 may generate a UI message as a SNAPSHOT message including a byte array containing values in a notify view array generated initially for the client subscription. The SNAPSHOT message may provide for display at a client device of a client view array of data of the subjects subscribed to in a client subscription as initially specified. In one embodiment, the server 22 may recognize, from metadata included in the byte array, that, for a particular client subscription, a client view array has not yet been displayed and include metadata in the SNAPSHOT message to indicate that the UI message is the first message for the client subscription. The server 22 may also include, in the SNAPSHOT message, rows metadata indicating the number of rows of the client view array to be displayed. The rows metadata advantageously may reduce use of processing and storage resources at the client device in connection with processing the data of the UI message and generating a client view array therefrom.

In one embodiment, the server 22 in block 220 may recognize, for a particular client subscription, from metadata provided with the byte array generated in block 215, that the data represents an update to the notify view array previously generated under the client subscription. In this circumstance, in block 220 the server 22 may generate a UI message as an UPDATE message and include metadata in the UPDATE message to indicate that the data in the byte array includes updated data or difference data for specific subjects of the client subscription. The server 22 in block 220 may continue to generate and transmit UPDATE messages, to cause updating of the client view array at the client device, as new byte arrays are generated based on updated notify view arrays.

In one embodiment, in the event the subjects and the values of the subjects of the notify view array remain unchanged, the byte arrays generated at block 570 may indicate the unchanged state of the notify view array and the server 22, in turn, may not send an UPDATE message to a client device for the client subscription.

In one embodiment, the server 22 may include metadata in a UI message to identify which subject(s) in the client view array is being updated in an UPDATE message.

In addition, in block 220, the server 22 may transmit a UI message over the communication network 18 to the client device 44 via a web-socket 45.

In one embodiment, the server 22 may send to a client device a UI message indicating the dependent data for a particular subscription item only once, and thereafter only send a UI message with updated values for a parent data subject of the subscription item, for updating values in the client view array displayed at the client device. Referring, for example, to FIG. 6, the server 22 may send a single time to the client device a UI message indicating, for Instrument ID 12, the dependent data of MSFT for Instrument Ticker and Microsoft Corporation for Instrument Name, and, for Customer 1, the dependent data of Customer1 for CustomerName and Bill Gates for Customer LongName.

In block 225, the client device 44 may receive a UI message from the server 22 and use the byte array in the UI message to generate and display a client view array, which corresponds to the current content and configuration of the notify view array. In one embodiment, when the UI message is a SNAPSHOT message, the client device may, based on the byte array in the UI message, automatically generate and display a client view array that has the same configuration and data of the notify view array from which the byte array was generated. The processor at the client device 44 may determine the UI message is SNAPSHOT message, based on the metadata indicating the message is a SNAPSHOT, and consequently perform processing more quickly and minimize use of processing resources and memory, to display a client view array based on the byte array in the SNAPSHOT message. In one embodiment, the client device 44 may use the number of rows indicated in the rows metadata of the SNAPSHOT message to perform error checking to confirm that all data for generating the client view array has been received from the apparatus 10.

In one embodiment, based on receipt of a SNAPSHOT message, the client device 44 may automatically display on a trade blotter a client view array including the object values indicated in the byte array of the SNAPSHOT message, using the number of rows indicated by the rows metadata to generate the client view array.

In one embodiment, based on rows metadata included in an UPDATE message, the client device may generate the client view array to include a different number of rows, such as more or less rows, than previously displayed, which may be the result of changes to filter criteria or changes in values for subjects for a same filter criteria as previous. For example, based on receipt of the UPDATE message, the client device 44 may automatically update a display on a trade blotter of a client view array to reflect the object values thereof indicated in the UPDATE message. In one embodiment, the UPDATE message may include a subject that indicates, for a unique ID value, that the corresponding row of the server array no longer satisfies filter criteria and, therefore, is not to be displayed in a client view array.

In one embodiment, the processor of the client device 44 may, based on the metadata in the UI message indicating the byte array includes difference data for one or more subjects, perform processing more quickly and with less processing resources and memory, to update the client view array being displayed at the client device, based on values for selected subjects in the byte array that are different from the values for the selected subjects in the client view array currently being displayed at the client device.

Referring to FIG. 8, the client device 44 may display a client view array as illustrated in FIG. 8, which includes only selected subscribed to subjects of respective IDs of the server array illustrated in FIG. 6, that remain following filtering based on filter criteria.

In one embodiment, in block 225, the processor of the client device 44 may use dependent data in a UI message to perform filtering and sorting of the subjects in the byte array of the UI message, to control the format and content of the client view array displayed at the client device.

In block 230, the server 22 may continuously monitor messages received, over the communication network 18 from a client device 44, for a subscription change request. The change request may include a change to a client subscription, such as different filter criteria or different subjects for an existing subscription item, or a new subscription item for a client subscription with the same or new subjects, in the client subscription. When the server 22 determines that a subscription change request is received, the server 22 may perform the operations of the process 200 starting from the block 210 for the client subscription as modified by the subscription change request, and then the blocks 212, 215, 220 and 230 consistent with the description of these blocks above.

In one embodiment, the server 22 may use a correlationID value to maintain a record of updates to the client subscription based on receipt of a subscription change request and store the correlationID value in the client subscription data. The server 22 may associate the correlation ID value as metadata for a subscribed to subject and increment the correlationID value for a subscribed to subject, following a subscription change request that changes a parameter of the subscribed to subject. The UI message sent from the server 22 may include the metadata of the correlationID value. Based on the metadata of the correlationID value in a UI message, the client device may determine whether a UI message contains data from processing by the server 22 prior to or after an update to a client subscription, and control display of data from the UI message in a client view array to reflect only the most updated client subscription. In some circumstances, due to processing latencies, even if a client subscription is updated at the apparatus 10 based on a client request, for example, a correlationID value for a subscribed to subject in the client subscription is updated to a value of 2 from a previous value of 1, the server 22 may still transmit a UI message having a correlationID value of 1. In this circumstance, the client device, which maintains a record of the current correlationID value for the subscribed to subject, may ignore data in the UI message for the subscribed to subject with the correlationID value of 1 and only process data in a UI message for the subscribed to subject with the correlationId value of 2. In this manner, the client device may control display of object values contained in UI messages following a change to a client subscription and ignore object values in UI messages that do not reflect subscription data for the updated client subscription.

Figure 9:
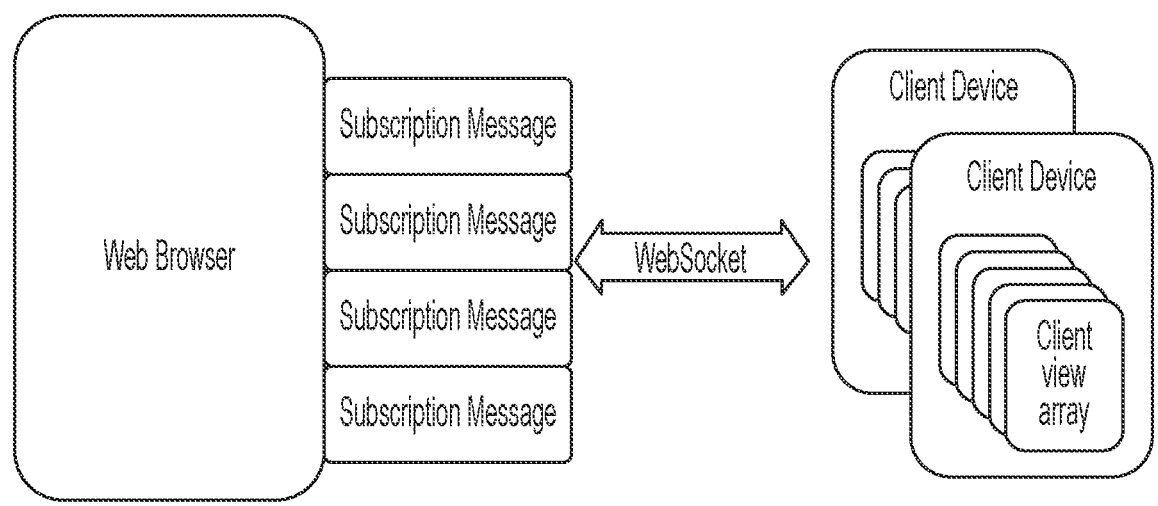
FIG. 9 illustrates an exemplary implementation of subscription management for multiple clients, according to the present disclosure.

It is noted that a client may have several independent subscriptions with the apparatus to have respective client view arrays of subscription data provided by the apparatus displayed at a client device, such as illustrated at FIG. 9. In one embodiment, the client device may be linked to one or more web-sockets, where each web-socket displays one or more client view arrays.

In one embodiment, dependent data for a subject of a subscription item may be added to the subject at a client device 44.

In one embodiment, the server 22 may receive, over the communication network 18, from the client device 44, a message indicating a request to delete a subscription. Based on the request to delete the subscription, the server 22 may cease to send UI messages for a client subscription and delete the client subscription indicated by the request.

In one embodiment, the data of a particular subject may change at a first rate in real time, and the server 22 may store the data received in the corresponding subject message thread at a second rate in real time, where the second rate is less than first rate. In one embodiment, the server 22 may provide for display of updated object values of the subject in a client view array at a client device according to a client subscription at a third rate which is the change rate and less than the second rate.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, various steps can be handled in a different order or simultaneously, and steps may be omitted or added.

The invention claimed is:

1. A subscription management system comprising:
at least one processor configured to control:
receiving, over a communication network, from at least one client device of at least one client, a subscribe request for a client subscription identifying subscribed to subjects for respective subscription items, in which the subscribed to subjects have respective change rates;
generating a server subscription array based on the subscribe request, in which each subscription item of the client subscription corresponds to a row of the server subscription array identified by a row identifier and includes at least one subscribed to subject;
generating, for each subscribed to subject of a respective subscription item in the server subscription array, a subject message thread indicating a row identifier of the subscription item, a current value of the subscribed to subject and a change rate for the subscribed to subject;
generating thread safe messages respectively from the subject message threads; generating, from current object values indicated for subscribed to subjects respectively of the thread safe messages and based on a given change rate corresponding to a given subscribed to subject, a byte array indicating first given current object values of first given subscribed to subjects respectively for first given subscription items in the server subscription array; and
transmitting, over the communication network to the at least one client device, a UI message including the byte array, to cause the at least one client device to display a client view array including the first given current object values of the first given subscribed to subjects respectively for the first given subscription items.

2. The subscription management system of claim 1, in which the at least one processor is configured to control:
receiving, over the communication network from the at least one client device, a subscription modify request message indicating a modification to the client subscription; and
updating the server subscription array by removing a first subject from, or adding a second subject to, the server subscription array.

3. The subscription management system of claim 1, in which the at least one processor is configured to control:
  determining, based on the thread safe messages, a notify view array reflective of a configuration of the client view array; and
  filtering the notify view array by removing a first row from the notify view array corresponding to a first row identifier of the row identifiers indicated in the server subscription array, based on filter criteria included in the client subscription.

4. The subscription management system of claim 3, in which the at least one processor is configured to control:
  receiving, over the communication network from the at least one client device, a subscription modify request message indicating the filter criteria.

5. The subscription management system of claim 1, wherein the subscribe request is received and the UI message is transmitted via a web-socket connection with the at least one client device.

6. The subscription management system of claim 1, in which the at least one processor is configured to control:
  generating a first thread safe message for a first subject message thread for a first subscription item in the client subscription, in which the first subscription item corresponds to a first row identifier indicated in the server subscription array;
  determining, based on the thread safe messages, a notify view array reflective of a configuration of the client view array;
  storing each first object value for a first subscribed to subject of the first thread safe message that becomes available during a predetermined time period chronologically in a stack of a data structure in at least one memory, in which each first object value becomes available at a second rate greater than a first change rate associated with the first subscribed to subject; and
  when elapsed time of an electronic timer is determined to be equal to a time threshold defined by the first change rate, updating the notify view array to indicate the first object value for the first subscribed to subject last added to the stack, as a current object value for the first subscribed to subject.

7. The subscription management system of claim 1, in which a first subscribed to subject in the client subscription associated with a first subscription item is identified with a first parent key, and in which the first parent key is used to determine a value of a second subscribed to subject in the client subscription associated with the first subscription item.

8. The subscription management system of claim 1, in which the byte array has a framework in an array format having a first element as a given row identifier of a given row of the server subscription array and each element in the framework successively following the first element is an object value for each successive subscribed to subject in the given row.

9. The subscription management system of claim 8, in which the UI message is a Java Script Object Notation (JSON) message.

10. The subscription management system of claim 8, in which first and second successive subscribed to subjects in the framework do not correspond to consecutive columns of the server subscription array.

11. The subscription management system of claim 1, in which the UI message includes object values of given subscribed to subjects having a same change rate.

12. A method for subscription management comprising:
  controlling, by at least one processor:
  receiving, over a communication network, from at least one client device of at least one client, a subscribe request for a client subscription identifying subscribed to subjects for respective subscription items, in which the subscribed to subjects have respective change rates;
  generating a server subscription array based on the subscribe request, in which each subscription item of the client subscription corresponds to a row of the server subscription array identified by a row identifier and includes at least one subscribed to subject;
  generating, for each subscribed to subject of a respective subscription item in the server subscription array, a subject message thread indicating a row identifier of the subscription item, a current value of the subscribed to subject and a change rate for the subscribed to subject;
  generating thread safe messages respectively from the subject message threads;
  generating, from current object values indicated for subscribed to subjects respectively of the thread safe messages and based on a given change rate corresponding to a given subscribed to subject, a byte array indicating first given current object values of first given subscribed to subjects respectively for first given subscription items in the server subscription array; and
  transmitting, over the communication network to the at least one client device, a UI message including the byte array, to cause the at least one client device to display a client view array including the first given current object values of the first given subscribed to subjects respectively for the first given subscription items.

13. The method of claim 12, further comprising controlling, by the at least one processor:
  receiving, over the communication network from the at least one client device, a subscription modify request message indicating a modification to the client subscription; and
  updating the server subscription array by removing a first subject from, or adding a second subject to, the server subscription array.

14. The method of claim 12, further comprising controlling, by the at least one processor:
  determining, based on the thread safe messages, a notify view array reflective of a configuration of the client view array; and
  filtering the notify view array by removing a first row from the notify view array corresponding to a first row identifier of the row identifiers indicated in the server subscription array, based on filter criteria included in the client subscription.

15. The method of claim 14, further comprising controlling, by the at least one processor:
  receiving, over the communication network from the at least one client device, a subscription modify request message indicating the filter criteria.

16. The method of claim 12, wherein the subscribe request is received and the UI message is transmitted via a web-socket connection with the at least one client device.

17. The method of claim 12, further comprising controlling by the at least one processor:
  generating a first thread safe message for a first subject message thread for a first subscription item in the client subscription, in which the first subscription item corresponds to a first row identifier indicated in the server subscription array;

determining, based on the thread safe messages, a notify view array reflective of a configuration of the client view array;

storing each first object value for a first subscribed to subject of the first thread safe message that becomes available during a predetermined time period chronologically in a stack of a data structure in a memory, in which each first object value becomes available at a second rate greater than a first change rate associated with the first subscribed to subject; and when elapsed time of an electronic timer is determined to be equal to a time threshold defined by the first change rate, updating the notify view array to indicate the first object value for the first subscribed to subject last added to the stack, as a current object value for the first subscribed to subject.

18. The method of claim 12, in which a first subscribed to subject in the client subscription associated with a first subscription item is identified with a first parent key, and in which the first parent key is used to determine a value of a second subscribed to subject in the client subscription associated with the first subscription item.

19. The method of claim 12, in which the byte array has a framework in an array format having a first element as a given row identifier of a given row of the server subscription array and each element in the framework successively following the first element is an object value for each successive subscribed to subject in the given row.

20. A non-transitory storage medium configured to store instructions which, when executed by at least one processor, control:

receiving, over a communication network, from at least one client device of at least one client, a subscribe request for a client subscription identifying subscribed to subjects for respective subscription items, in which the subscribed to subjects have respective change rates;

generating a server subscription array based on the subscribe request, in which each subscription item of the client subscription corresponds to a row of the server subscription array identified by a row identifier and includes at least one subscribed to subject;

generating, for each subscribed to subject of a respective subscription item in the server subscription array, a subject message thread indicating a row identifier of the subscription item, a current value of the subscribed to subject and a change rate for the subscribed to subject;

generating thread safe messages respectively from the subject message threads;

generating, from current object values indicated for subscribed to subjects respectively of the thread safe messages and based on a given change rate corresponding to a given subscribed to subject, a byte array indicating first given current object values of first given subscribed to subjects respectively for first given subscription items in the server subscription array; and transmitting, over the communication network to the at least one client device, a UI message including the byte array, to cause the at least one client device to display a client view array including the first given current object values of the first given subscribed to subjects respectively for the first given subscription items.

\* \* \* \* \*